US012781140B2

(12) United States Patent
Akah et al.

(10) Patent No.: US 12,781,140 B2
(45) Date of Patent: Nov. 3, 2026

(54) DUAL REACTOR SYSTEM FOR DECONTAMINATION AND CONVERSION OF PLASTIC DERIVED OIL TO HYDROCARBON INTERMEDIATES

(71) Applicant: Saudi Arabian Oil Company, Dhahran (SA)

(72) Inventors: Aaron Chi Akah, Dhahran (SA); Rashed Aleisa, Dhahran (SA); Ahmad Jazzar, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 235 days.

(21) Appl. No.: 18/402,120

(22) Filed: Jan. 2, 2024

(65) Prior Publication Data

US 2025/0215336 A1 Jul. 3, 2025

(51) Int. Cl.

| | |
|---|---|
| ***C10G 55/06*** | (2006.01) |
| ***B01D 15/00*** | (2006.01) |
| ***B01J 8/00*** | (2006.01) |
| ***B01J 8/20*** | (2006.01) |
| ***B01J 8/26*** | (2006.01) |

(52) U.S. Cl.

CPC ............. *C10G 55/06* (2013.01); *B01D 15/00* (2013.01); *B01J 8/007* (2013.01); *B01J 8/20* (2013.01); *B01J 8/26* (2013.01); *B01J 2208/00761* (2013.01); *C10G 2300/1003* (2013.01); *C10G 2300/202* (2013.01)

(58) Field of Classification Search

CPC ............ C10G 55/06; C10G 2300/1003; C10G 2300/202; C10G 1/002; C10G 1/10; C10G 11/18; B01D 15/00; B01J 8/007; B01J 8/20; B01J 8/26; B01J 2208/00761

See application file for complete search history.

(56) References Cited

U.S. PATENT DOCUMENTS 5,744,668 A * 4/1998 Zhou ........................ C10G 1/10 585/651
6,346,220 B1 2/2002 Kosugi et al.
(Continued)

OTHER PUBLICATIONS

Fekhar, Pyrolysis of chlorine contaminated municipal plastic waste, Journal of the Energy Institute, 92 (2019) 1270-1286 (Year: 2019).*

*Primary Examiner* — Michelle Stein
(74) *Attorney, Agent, or Firm* — Dinsmore & Shohl LLP

(57) ABSTRACT

A process for upgrading a plastic derived oil includes providing the plastic derived oil comprising hydrocarbons and greater than or equal to 100 ppmw halogen-containing compounds and contacting the plastic derived oil with an MMO catalyst in a first reactor at reaction conditions to remove halogens from the plastic derived oil to produce a first reactor effluent with less than 100 ppmw halogen-containing compounds. The process includes contacting the first reactor effluent with an adsorbent to produce a treated first reactor effluent, passing the treated first reactor effluent to a second reactor, and contacting the treated first reactor effluent with a cracking catalyst in the second reactor. Contacting with the cracking catalyst may cause hydrocarbons in the treated first reactor effluent to undergo catalytic cracking to produce a second reactor effluent comprising light olefins, naphtha range hydrocarbons, or combinations thereof.

18 Claims, 5 Drawing Sheets

(56) References Cited

U.S. PATENT DOCUMENTS

| | | | | |
|---|---|---|---|---|
| 6,861,568 | B1 | 3/2005 | Guffey et al. | |
| 8,420,875 | B1 | 4/2013 | Mackay et al. | |
| 8,927,797 | B2 | 1/2015 | Sarker | |
| 9,404,046 | B2 | 8/2016 | Sarker | |
| 10,093,860 | B2 | 10/2018 | Griffiths | |
| 10,717,934 | B2 | 7/2020 | Griffiths | |
| 2018/0002609 | A1* | 1/2018 | Narayanaswamy | C10G 1/02 |
| 2022/0204870 | A1* | 6/2022 | Portela | C10G 51/06 |
| 2023/0203382 | A1* | 6/2023 | Brunetti | C10G 53/04 585/241 |
| 2023/0257660 | A1 | 8/2023 | Akah | |
| 2023/0272292 | A1* | 8/2023 | Weiss | B01J 29/076 585/241 |

* cited by examiner

DUAL REACTOR SYSTEM FOR DECONTAMINATION AND CONVERSION OF PLASTIC DERIVED OIL TO HYDROCARBON INTERMEDIATES

BACKGROUND

Field

The present disclosure generally relates to systems and processes for upgrading plastic derived oils, more specifically, systems and processes for decontaminating and converting plastic derived oils to greater value hydrocarbon intermediates, fuel components, or both.

Technical Background

The use of plastics in commercial and industrial application has become prolific. The increasing use of plastics worldwide has increased the generation of waste plastic, which presents a sustainability opportunity. Plastic is a synthetic or semisynthetic organic polymer composed of mainly carbon and hydrogen. Further, plastics tend to be durable, with a slow rate of degradation, therefore they stay in the environment for a long time and are not prone to rapid breakdown upon disposal. Pure plastics are generally insoluble in water and nontoxic. However, some additives used in plastic preparation are toxic and may leach into the environment. Examples of toxic additives include phthalates. Other typical additives include fillers, colorant, plasticizers, stabilizers, anti-oxidants, flame retardants, ultraviolet (UV) light absorbers, antistatic agents, blowing agents, lubricants used during its preparation to change its composition and properties.

Development of processes for converting waste plastics into reusable materials, such as but not limited to chemical products, intermediates, or low carbon footprint fuels is continuing. Plastics pyrolyze at high temperatures and polymers can be converted back to their original monomers or smaller polymers as gas or liquid and can be recovered. Oils derived from plastics can contain compounds useful as fuel blending components or chemical feedstocks. However, the additives added to the plastic during production present challenges in effectively utilizing the recovered products from pyrolysis. Upon pyrolysis, the additives end-up in the pyrolysis products and thus require further processing to generate useful products. Additionally, the oils produced from pyrolysis of plastic waste can present a challenge due to the presence of halogenated organic compounds, such as those resulting from the presence of polyvinyl chloride (PVC) or other halogen-containing plastics. PVC is one of the most abundant plastics used for consumable goods. Waste plastic can contain from 1 weight percent (wt. %) to 5 wt. % PVC or other halogen-containing plastics. However, recycling of used PVC and other halogen-containing plastics is very difficult due to the presence of chlorine in the structure.

SUMMARY

Plastic derived oils have good properties and hydrocarbon constituents useful for application as fuel blending components or chemical feedstocks. However, plastic derived oils can present a processing challenge due to the presence of halogen-containing compounds (such as chlorine-containing hydrocarbon compounds) and due to the wide boiling point temperature range, such as C5 to C25 or greater (30° C. to 400° C. or even greater than 400° C.). Plastic derived oils can also include compounds with different functional groups and families of organic compounds such as but not limited to oxygenates, aromatic compounds, olefins, alkanes, other hydrocarbon compounds, or combinations of these. The direct use of plastic waste derived oil in catalytic cracking to produce chemicals can lead to problems downstream because of the presence of halogenated compounds, such as but not limited to chlorine-containing hydrocarbon compounds.

Accordingly, ongoing needs exist for systems and processes for decontaminating plastic derived oils and converting the plastic derived oils into greater value chemical products and intermediates, such as but not limited to light olefins (C2-C4 olefins), light aromatic compounds (C6-C8 aromatic compounds), low carbon footprint fuel components, or combinations of these. The present disclosure satisfies these needs by presenting systems and processes for removing halogen-containing compounds and other contaminants from the plastic derived oils and converting the plastic derived oils to greater value chemical products and intermediates. In particular, the systems and methods disclosed herein include a dual reactor system for decontaminating and converting plastic derived oils to produce the greater value chemical products and intermediates, which can include but are not limited to light olefins, light aromatic compounds, low carbon footprint fuel blending components, or combinations of these.

According to one or more aspects of the present disclosure, a process for upgrading a plastic derived oil may include providing the plastic derived oil comprising hydrocarbons and greater than or equal to 100 parts per million by weight (ppmw) halogen-containing compounds based on the total weight of the plastic derived oil. The process may further include contacting the plastic derived oil with a mixed metal oxide catalyst (MMO catalyst) in a first reactor at reaction conditions, where contacting the plastic derived oil with the MMO catalyst at reaction conditions may remove halogens from the plastic derived oil to produce a first reactor effluent comprising less than 100 ppmw halogen-containing compounds based on the total weight of the first reactor effluent. The process may further include contacting the first reactor effluent with an adsorbent in an adsorption unit disposed downstream of the first reactor to produce a treated first reactor effluent, passing at least a portion of the treated first reactor effluent to a second reactor disposed downstream of the first reactor, and contacting at least a portion of the treated first reactor effluent with a cracking catalyst in the second reactor. The cracking catalyst is different from the mixed metal oxide catalyst, and the contacting with the cracking catalyst may cause hydrocarbons in the at least a portion of the treated first reactor effluent to undergo catalytic cracking to produce a second reactor effluent comprising light olefins, naphtha range hydrocarbons, or combinations thereof.

According to one or more second aspects of the present disclosure a system for upgrading a plastic derived oil may comprise a plastic derived oil stream comprising the plastic derived oil, a first reactor comprising a mixed metal oxide (MMO) catalyst, an adsorption unit disposed downstream of the first reactor, and a second reactor disposed downstream of the first reactor and the adsorption unit. The MMO catalyst may comprise a plurality of metal oxides, where each of the metal oxides may be randomly distributed throughout the MMO catalyst. The first reactor may be configured to receive at least a portion of the plastic derived oil stream and to contact the portion of the plastic derived oil stream with the MMO catalyst at reaction conditions sufficient to remove halogen-containing compounds and other contaminants from the plastic derived oil to produce a first reactor effluent. The adsorption unit may be configured to contact the first reactor effluent with an adsorbent to remove additional halogen-containing compounds from the first reactor effluent to produce a treated first reactor effluent. The second reactor may comprise a cracking catalyst. The second reactor may be configured to contact at least a portion of the treated first reactor effluent with the cracking catalyst at reaction conditions sufficient to cause hydrocarbons in the at least a portion of the treated first reaction effluent to undergo catalytic cracking to produce a second reactor effluent comprising light olefins, naphtha range hydrocarbons, middle distillates, or combinations thereof.

Additional features and advantages of the technology described in this disclosure will be set forth in the detailed description which follows, and in part will be readily apparent to those skilled in the art from the description or recognized by practicing the technology as described in this disclosure, including the detailed description which follows, the claims, as well as the appended drawings.

BRIEF DESCRIPTION OF THE DRAWINGS

The following detailed description of specific embodiments of the present disclosure can be best understood when read in conjunction with the following drawings, where like structure is indicated with like reference numerals and in which.

Figure 1:
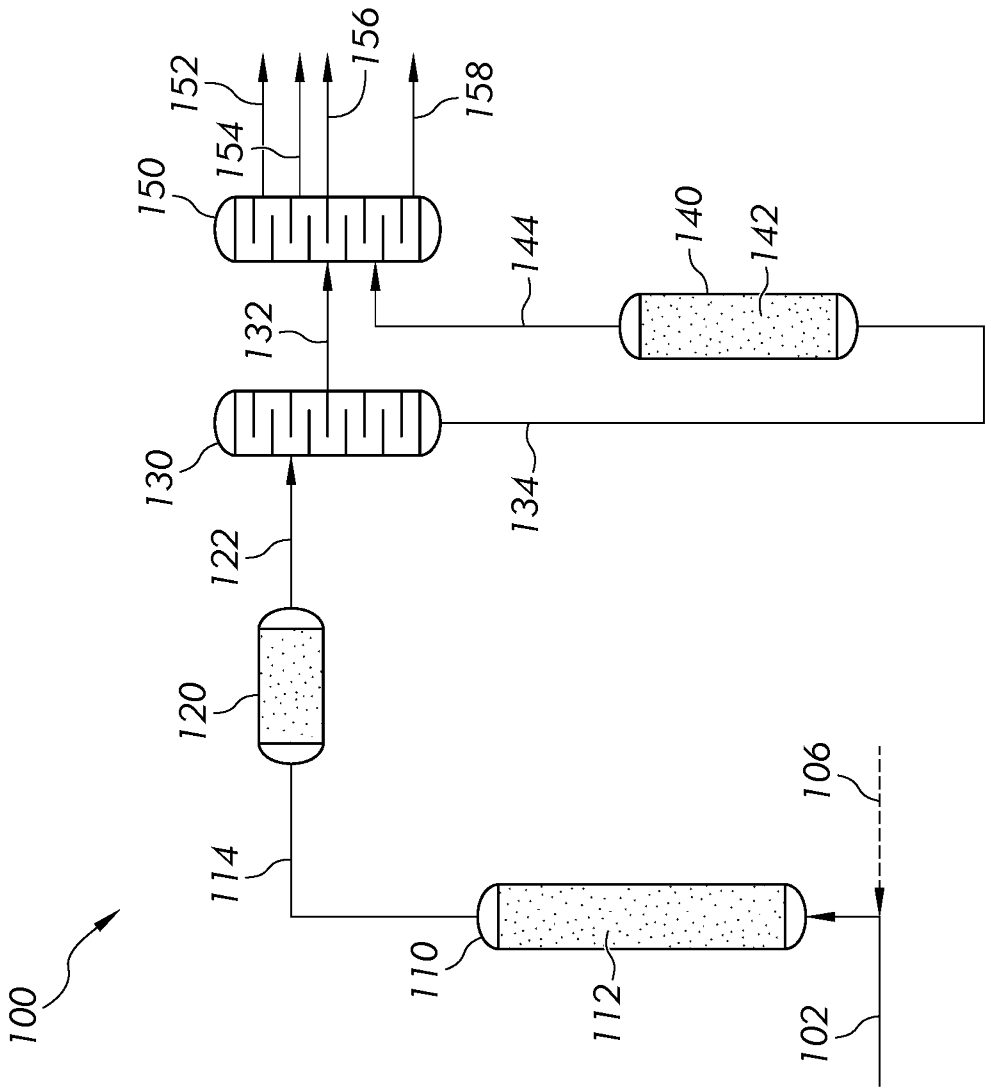
FIG. 1 schematically depicts a generalized flow diagram of a system for upgrading plastic derived oils, according to one or more embodiments shown and described in this disclosure.
Figure 2:
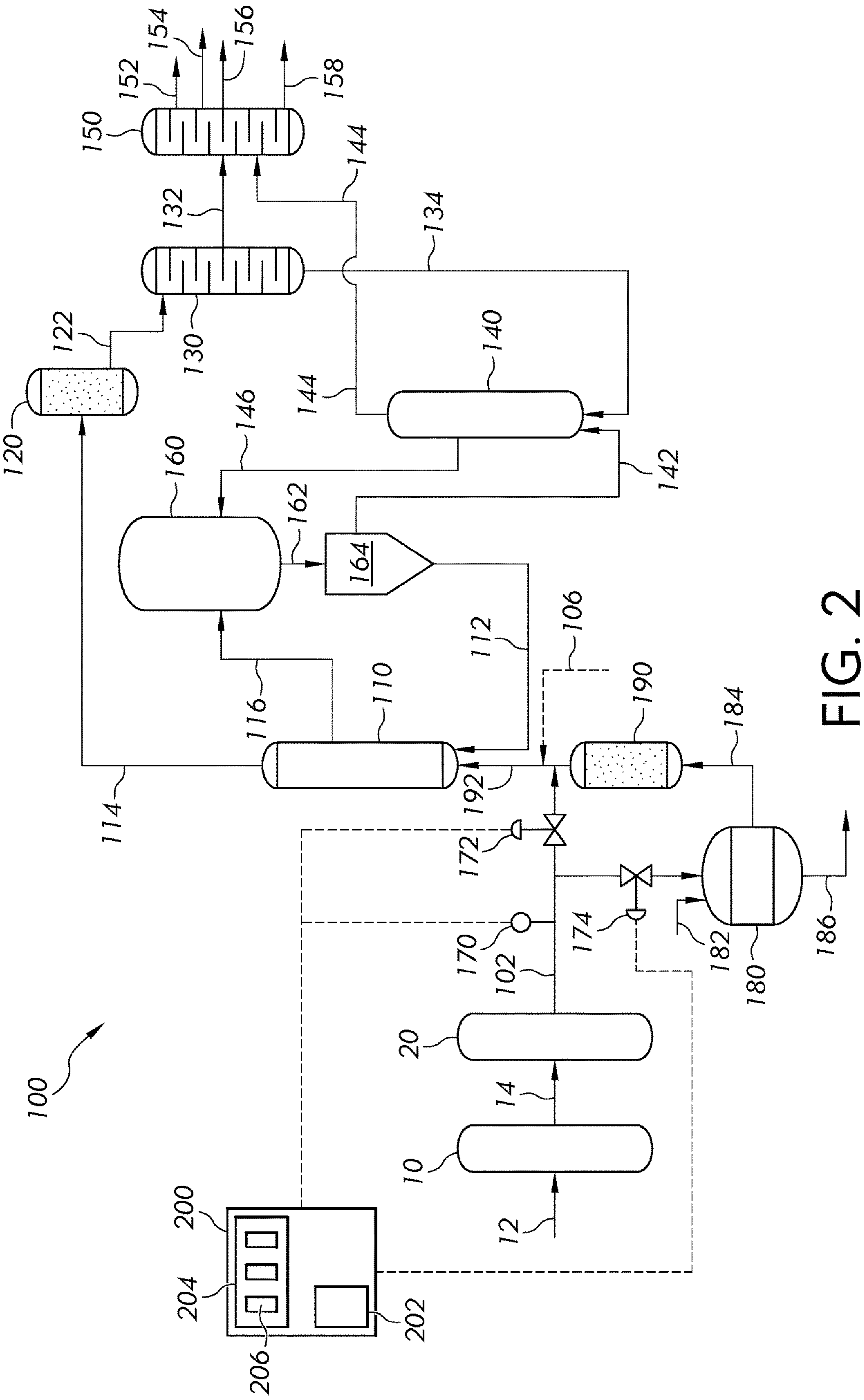
FIG. 2 schematically depicts a generalized flow diagram of another system for upgrading plastic derived oils, according to one or more embodiments shown and described in this disclosure.
Figure 3:
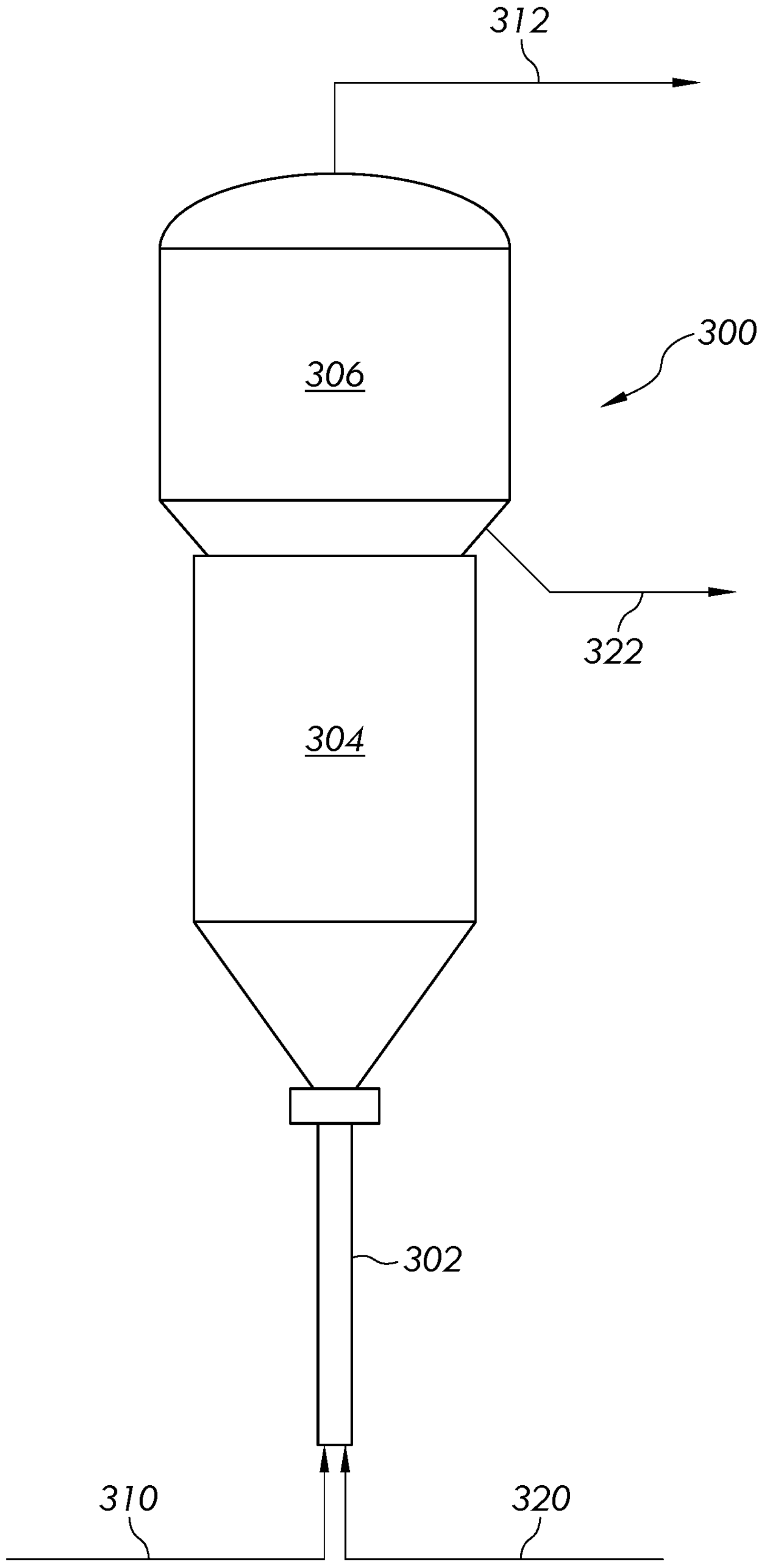
FIG. 3 schematically depicts a generalized flow diagram of a riser fluidized bed reactor system, according to one or more embodiments shown and described in this disclosure.

For the purpose of describing the simplified schematic illustrations and descriptions of FIGS. 1-3 some of the numerous valves, temperature sensors, electronic controllers, and the like that may be employed and well known to those of ordinary skill in the art of certain chemical processing operations are not included. Further, accompanying components that are often included in chemical processing operations, such as, for example, air supplies, heat exchangers, surge tanks, catalyst hoppers, or other related systems are not depicted. It would be known that these components are within the spirit and scope of the present embodiments disclosed. However, operational components, such as those described in the present disclosure, may be added to the embodiments described in this disclosure.

It should further be noted that arrows in the drawings refer to process streams. However, the arrows may equivalently refer to transfer lines that may serve to transfer process steams between two or more system components. Additionally, arrows that connect to system components define inlets or outlets in each given system component. The arrow direction corresponds generally with the major direction of movement of the materials of the stream contained within the physical transfer line signified by the arrow. Furthermore, arrows that do not connect two or more system components signify a product stream which exits the depicted system or a system inlet stream which enters the depicted system. Product streams may be further processed in accompanying chemical processing systems or may be commercialized as end products. System inlet streams may be streams transferred from accompanying chemical processing systems or may be non-processed feedstock streams. Some arrows may represent recycle streams, which are effluent streams of system components that are recycled back into the system. However, it should be understood that any represented recycle stream, in some embodiments, may be replaced by a system inlet stream of the same material, and that a portion of a recycle stream may exit the system as a system product.

Additionally, arrows in the drawings may schematically depict process steps of transporting a stream from one system component to another system component. For example, an arrow from one system component pointing to another system component may represent "passing" a system component effluent to another system component, which may include the contents of a process stream "exiting" or being "removed" from one system component and "introducing" the contents of that product stream to another system component.

It should be understood that two or more process streams are "mixed" or "combined" when two or more lines intersect in the schematic flow diagrams of FIG. 1-3. Mixing or combining may also include mixing by directly introducing both streams into a like reactor, separation device, or other system component. For example, it should be understood that when two streams are depicted as being combined directly prior to entering a separator or reactor, that in some embodiments the streams could equivalently be introduced into the separator or reactor and be mixed in the reactor.

Reference will now be made in greater detail to various embodiments of the present disclosure, some embodiments of which are illustrated in the accompanying drawings. Whenever possible, the same reference numerals will be used throughout the drawings to refer to the same or similar parts.

DETAILED DESCRIPTION

Embodiments of the present disclosure are directed to systems and processes for processing plastic derived oils, such as decontaminating and converting plastic derived oils to produce greater value chemical products and intermediates. Referring now to FIG. 1, one embodiment of the systems 100 of the present disclosure for processing the plastic derived oils 102 is schematically depicted. The system 100 includes a plastic derived oil stream 102 comprising the plastic derived oil and a first reactor 110 comprising a mixed metal oxide (MMO) catalyst 112. The MMO catalyst 112 may comprise a plurality of metal oxides, where each of the metal oxides are randomly distributed throughout the MMO catalyst 112. The first reactor 110 may be configured to receive at least a portion of the plastic derived oil stream 102 and to contact the portion of the plastic derived oil stream 102 with the MMO catalyst 112 at reaction conditions sufficient to remove halogen-containing compounds and other contaminants from the plastic derived oil to produce a first reactor effluent 114. The system 100 may further include an adsorption unit 120 disposed downstream of the first reactor 110, where the adsorption unit 120 may be configured to contact the first reactor effluent 114 with an adsorbent to remove additional halogen-containing compounds from the first reactor effluent 114 to produce a treated first reactor effluent 122. The system 100 further includes a second reactor 140 disposed downstream of the first reactor 110 and the adsorption unit 120. The second reactor 140 comprises a cracking catalyst 142. The second reactor 140 may be configured to contact at least a portion of the treated first reactor effluent 122 with the cracking catalyst 142 at reaction conditions sufficient to cause hydrocarbons in the at least a portion of the treated first reaction effluent 122 to undergo catalytic cracking to produce a second reactor effluent 144 comprising light olefins, naphtha range hydrocarbons, middle distillates, or combinations thereof.

Additionally, processes for upgrading plastic derived oil are disclosed. The processes may include providing a plastic derived oil 102 comprising hydrocarbons and greater than or equal to 100 ppm by weight halogen-containing compounds based on the total weight of the plastic derived oil 102. The processes may further include contacting the plastic derived oil 102 with the MMO catalyst 112 in the first reactor 110 at reaction conditions, where contacting the plastic derived oil 102 with the MMO catalyst 112 at the reaction conditions removes halogen-containing compounds from the plastic derived oil 102 to produce a first reactor effluent 114 comprising less than 100 ppm by weight halogen-containing compounds based on the total weight of the first reactor effluent 114. The processes may further include contacting the first reactor effluent 114 with an adsorbent in the adsorption unit 120 disposed downstream of the first reactor 110 to produce a treated first reactor effluent 122, passing at least a portion of the treated first reactor effluent 122 to the second reactor 140 disposed downstream of the first reactor 110, and contacting at least a portion of the treated first reactor effluent 122 with the cracking catalyst 142 in the second reactor 140. The cracking catalyst 142 is different from the MMO catalyst 112. The contacting with the cracking catalyst 142 causes hydrocarbons in the at least a portion of the treated first reactor effluent 122 to undergo catalytic cracking to produce the second reactor effluent 144 comprising light olefins, naphtha range hydrocarbons, or combinations thereof. The processes may further include separating the second reactor effluent 144 in a product separation system to produce a plurality of product streams, such as but not limited to one or more olefin product stream, a naphtha stream, a gasoline stream, a heavy stream, or combinations thereof.

As used in this disclosure, the term "catalyst" refers to any substance that increases the rate of a specific chemical reaction. Catalysts and catalyst components described in this disclosure can be utilized to promote various reactions, such as, but not limited to selective hydrogenation, ring opening, disproportionation, dealkylation, hydrodealkylation, transalkylation, cracking, aromatic cracking, other chemical reactions, or combinations of these.

As used in this disclosure, the term "used catalyst" refers to catalyst that has been contacted with reactants but has not been regenerated to restore at least a portion of the catalytic activity. The term "regenerated catalyst" refers to a catalyst that has been regenerated in a regenerator or through a regeneration process to increase the catalytic activity, the temperature, or both of the regenerated catalyst.

As used in this disclosure, the term "aromatic compounds" refers to compounds having one or more aromatic ring structures. The term "light aromatic compounds" refers to compounds having an aromatic ring, with or without substitution, and from six to eight carbon atoms. The term "BTEX" refers to any combination of one or a plurality of benzene, toluene, ethylbenzene, para-xylene, meta-xylene, and ortho-xylene.

As used in this disclosure, the term "xylenes," when used without a designation of the isomer, such as the prefix para, meta, or ortho, refers to one or more of meta-xylene, ortho-xylene, para-xylene, and mixtures of these xylene isomers.

As used in this disclosure, the terms "butenes" and "mixed butenes" refers to 1-butene, cis-2-butene, trans-2-butene, isobutene, and combinations of these. As used in this disclosure, the term "normal butenes" refers to 1-butene, cis-2-butene, trans-2-butene, and any combination thereof, but not including isobutene.

As used in this disclosure, the terms "low carbon footprint fuels" or "low carbon footprint fuel components" refers to fuels and/or fuel components derived from non-fossil origin in contrast to conventional fuels which are produced from petroleum extracted from subterranean sources. The "low carbon footprint fuels" or "low carbon footprint fuel components" are produced sustainably from municipal or organic waste, sustainable biomass, renewables, and circular $CO_2$. Production and use of the low carbon footprint fuels and fuel components result in very little or no additional $CO_2$ generated. Low carbon footprint fuels and fuel components can help to reduce greenhouse emissions and mitigate the effects of climate change.

As used in this disclosure, the terms "boiling point temperature," or "boiling temperature," or "boiling point" refer to the temperature at which a compound or composition boils at atmospheric pressure, unless otherwise stated.

As used in this disclosure, the term "initial boiling point" or "IBP" of a composition refers to the temperature at which the constituents of the composition having the lowest boiling point temperature begin to transition from the liquid phase to the vapor phase.

As used in this disclosure, the term "final boiling point" or "FBP" of a composition refers to the temperature at which the greatest boiling temperature constituents of the composition transition from the liquid phase to the vapor phase.

As used in this disclosure, the term "fixed-bed reactor" refers to a reactor in which a catalyst is contained within the reactor and is maintained is a fixed position within the reactor. A fixed-bed reactor, as used in this disclosure, can include a plurality of material inlets, but has a single effluent outlet.

As used in this disclosure, the term "separation unit" refers to any separation device that at least partially separates one or more chemicals in a mixture from one another. For example, a separation unit may selectively separate different chemical species from one another, forming one or more chemical fractions. Examples of separation units include, without limitation, distillation columns, fractionators, flash drums, knock-out drums, knock-out pots, centrifuges, filtration devices, traps, scrubbers, expansion devices, membranes, solvent extraction devices, high-pressure separators, low-pressure separators, and the like. It should be understood that separation processes described in this disclosure may not completely separate all of one chemical consistent from all of another chemical constituent. It should be understood that the separation processes described in this disclosure "at least partially" separate different chemical components from one another, and that even if not explicitly stated, it should be understood that separation may include only partial separation. As used in this disclosure, one or more chemical constituents may be "separated" from a process stream to form a new process stream. Generally, a process stream may enter a separation unit and be divided or separated into two or more process streams of desired composition.

As used in this disclosure, the terms "upstream" and "downstream" refer to the relative positioning of unit operations with respect to the direction of flow of the process streams through the system. A first unit operation of a system is considered "upstream" of a second unit operation if process streams flowing through the system encounter the first unit operation before encountering the second unit operation. Likewise, a second unit operation is considered "downstream" of the first unit operation if the process streams flowing through the system encounter the first unit operation before encountering the second unit operation.

As used in this disclosure, passing a stream or effluent from one unit "directly" to another unit refers to passing the stream or effluent from the first unit to the second unit without passing the stream or effluent through an intervening reaction system or separation system that substantially changes the composition of the stream or effluent. Heat transfer devices, such as heat exchangers, preheaters, coolers, condensers, or other heat transfer equipment, and pressure devices, such as pumps, pressure regulators, compressors, or other pressure devices, are not considered to be intervening systems that change the composition of a stream or effluent, unless otherwise specifically stated in the present disclosure. Combining two streams or effluents together upstream of a process unit also is not considered to comprise an intervening system that changes the composition of one or both of the streams or effluents being combined. Simply dividing a stream into two streams having the same composition is also not considered to comprise an intervening system that changes the composition of the stream.

As used in this disclosure, the term "effluent" refers to a stream that is passed out of a reactor, a reaction zone, or a separator following a particular reaction or separation process. Generally, an effluent has a different composition than the stream that entered the separator, reactor, or reaction zone. It should be understood that when an effluent is passed to another system unit, only a portion of that system stream may be passed. For example, a slip stream (having the same composition) may carry some of the effluent away, meaning that only a portion of the effluent may enter the downstream system unit. The terms "reaction effluent" or "reactor effluent" are more particularly be used to refer to a stream that is passed out of a reactor or reaction zone.

It should further be understood that streams may be named for the components of the stream, and the component for which the stream is named may be the major component of the stream (such as comprising from 50 weight percent (wt. %), from 70 wt. %, from 90 wt. %, from 95 wt. %, from 99 wt. %, from 99.5 wt. %, or even from 99.9 wt. % of the contents of the stream to 100 wt. % of the contents of the stream, notwithstanding any inert gases or diluents added to the stream). It should also be understood that components of a stream are disclosed as passing from one system component to another when a stream comprising that component is disclosed as passing from that system component to another. For example, a disclosed "olefin stream" passing to a first system component or from a first system component to a second system component should be understood to equivalently disclose the "olefin compounds" passing to the first system component or passing from a first system component to a second system component.

The demand for circular chemicals to be used for the production of chemical intermediates used in production of polymers and plastics as well as for fuel components is steadily increasing. Circular chemicals can include monomers such as ethylene, propylene, butylenes, benzene, xylenes, and toluene that are produced from plastic waste and plastic derived oil. These monomers can be then be used again for the production of polymers such as polyethylene, polypropylene and polyethylene terephthalate. They are called circular chemicals because they are derived from the process of recycling waste materials back to produce useful chemical products and intermediates. Converting plastic waste can also produce low carbon footprint fuel components, which can provide additional sources of fuel with reduced $CO_2$ generation, compared to fuel components derived from fossil fuels extracted from subterranean sources.

As previously discussed, plastic derived oils have good properties and contain hydrocarbon constituents useful for application as chemical intermediates and fuel blending components. However, plastic derived oils include halogen-containing compounds and other contaminants resulting from additives included in the plastics, and the plastic derived oils can have a broad boiling point temperature range, such as from 30° C. to 400° C., or even greater than 400° C. Plastic derived oils can also include compounds with different functional groups and families of organic compounds, such as but not limited to oxygenates, aromatic compounds, olefins, alkanes, other hydrocarbon compounds, or combinations of these.

The direct use of plastic waste derived oils in catalytic cracking to produce chemical products, intermediates, or fuel components can lead to problems downstream because of the presence of the halogen-containing compounds. These problems can include corrosion caused by the breakdown of organic halides, such as organic chlorides, to form HCl, which is corrosive and can attack refinery equipment such as pipes, valves and heat exchangers, leading to leaks, equipment failure, and costly repairs. The presence of organic halides can also poison catalysts, such as cracking catalysts, used in refining processes, which can reduce the efficiency of the refining process, leading to lower quality products and process inefficiencies. Organic halides can form salts, such as but not limited to ammonium chloride ($NH_4Cl$), that can foul refinery equipment, such as pipes or heat exchangers. Organic halides can also contaminate refined products such as gasoline and diesel fuels, resulting in product quality problems such as but not limited to engine knocking and fuel injector fouling. Further, organic chlorides can be released into the environment through waste water and air emissions, which can have a negative impact on human health and the environment.

The systems and processes of the present disclosure solve these problems associated with recycling of plastic waste into greater value chemical intermediates and fuel components. The systems and processes of the present disclosure are directed to decontamination and conversion of plastic derived oils to greater value chemical products and intermediates and fuel blending components. In particular, the systems and processes of the present disclosure include a dual reactor system in which the plastic derived oils are decontaminated in a first reactor using a mixed metal oxide catalyst (MMO catalyst) to remove halogen-containing compounds and other contaminants, and at least a portion of the first reactor effluent is then catalytically cracked in a second reactor to produce a second reactor effluent containing one or more greater value products and intermediates, such as but not limited to light olefins, light aromatic compounds, naphtha range hydrocarbons, low carbon footprint fuel components, or combinations of these. In embodiments, the first reactor and the second reactor may both be fluidized bed reactors using different types of catalysts, and the system may include a single regenerator in which both different types of catalysts are regenerated at the same time to produce a regenerated catalyst mixture. The regenerated catalyst mixture can then pass to a catalyst separator operable to separate the two different catalysts by density to produce a regenerated MMO catalyst and a regenerated cracking catalyst.

The decontamination and catalytic cracking produce circular chemicals, which are chemicals that are recovered from waste and reused to make additional products. The systems and processes of the present disclosure, which include decontamination and catalytic cracking, may enable the recycling of solid waste plastic while reducing downstream problems caused by chlorine-containing compounds or other contaminants. In particular, the first reactor effluent coming from the first reactor substantially reduces the level of contaminants especially halogens to the levels that meet refinery specification. This makes the first reactor effluent suitable for further conversion to circular chemicals and fuels. The reaction parameters and the cracking catalyst in the second reactor can, thus, be adjusted to maximize the yield of circular chemicals, low carbon footprint fuel components, or both. Low carbon footprint fuels and fuel components can help to reduce greenhouse emissions and mitigate the effects of climate change. The systems and processes of the present disclosure can be easily integrated into existing petroleum refineries and petrochemical installations.

Referring now to FIG. 1, one embodiment of a system 100 for upgrading a plastic derived oil stream is schematically depicted. The system 100 may include a plastic derived oil stream 102, a first reactor 110, an adsorption unit 120 disposed downstream of the first reactor 110, a second reactor 140 disposed downstream of the first reactor 110 and the adsorption unit 120, and a product separation system 150 disposed downstream of the second reactor 140. The system 100 may also include a first reactor effluent separation system 130 disposed between the adsorption unit 120 and the second reactor 140. The first reactor 110 may include a mixed metal oxide catalyst 112 (MMO catalyst 112) and may be configured to contact the plastic derived oil stream 102 with the MMO catalyst 112 at reaction conditions sufficient to remove halogen compounds and other contaminants from the plastic derived oil stream 102 to produce a first reactor effluent 114. The adsorption unit 120 may comprise an absorbent and may be configured to contact the first reactor effluent 114 with the adsorbent to produce a treated first reactor effluent 122. The second reactor 140 may include a cracking catalyst 142 and may be configured to contact at least a portion of the treated first reactor effluent 122 with the cracking catalyst 142 at reaction conditions sufficient to cause hydrocarbons in the at least a portion of the treated first reaction effluent 122 to undergo catalytic cracking to produce a second reactor effluent 144. The product separation system 150 may be configured to separate the second reactor effluent 144 to produce a plurality of product streams, such as but not limited to an ethylene stream, a propylene stream, a mixed butenes stream, a light aromatics stream, a naphtha stream, a gasoline stream, a heavy stream, or combinations of these.

The plastic derived oil stream 102 may be a liquid stream comprising hydrocarbons and produced through melting, dehalogenation, and pyrolysis of solid waste plastics. As previously discussed, the plastic derived oil stream 102 may include hydrocarbons, such as but not limited to aromatic compounds, olefins, alkanes, other hydrocarbon compounds. Additionally, the plastic derived oil stream 102 may include other organic compounds, such as but not limited to oxygenates, organic halide compounds, plastic additives, and other contaminants. The plastic derived oil stream 102 may comprise a concentration of organic halide compounds of from 10 part per million by weight (ppmw) to 500 ppmw. In embodiments, the plastic derived oil stream 102 may comprise a concentration of organic halide compounds of from 10 ppmw to 400 ppmw, from 10 ppmw to 300 ppmw, from 50 ppmw to 500 ppmw, from 50 ppmw to 400 ppmw, from 50 ppmw to 300 ppmw, from 100 ppmw to 500 ppmw, from 100 ppm to 400 ppmw, from 100 ppmw to 300 ppmw, from 150 ppmw to 500 ppmw, from 150 ppmw to 400 ppmw, or from 150 ppmw to 300 ppmw.

In embodiments, the plastic derived oil stream 102 may comprise naphtha range hydrocarbons, middle distillates, heavy compounds, or combinations of these. Naphtha range hydrocarbons refer to hydrocarbons having atmospheric boiling point temperatures of from 25° C. to 221° C., middle distillates include hydrocarbons having atmospheric boiling point temperatures of from 221° C. to 343° C., and the heavy compounds refer to hydrocarbons having atmospheric boiling point temperatures of greater than 343° C. In embodiments, the plastic derived oil stream 102 may comprise from 20 wt. % to 45 wt. % naphtha range hydrocarbons, such as from 20 wt. % to 40 wt. %, from 20 wt. % to 35 wt. %, from 20 wt. % to 30 wt. %, from 30 wt. % to 45 wt. %, from 30 wt. % to 40 wt. %, from 35 wt. % to 45 wt. %, from 35 wt. % to 40 wt. %, or about 38 wt. % naphtha range hydrocarbons based on the total weight of the plastic derived oil stream 102. In embodiments, the plastic derived oil stream 102 may comprise from 40 wt. % to 70 wt. % middle distillates, such as from 40 wt. % to 60 wt. %, from 40 wt. % to 55 wt. %, from 40 wt. % to 50 wt. %, from 45 wt. % to 70 wt. %, from 45 wt. % to 60 wt. %, from 45 wt. % to 55 wt. %, from 45 wt. % to 50 wt. %, or about 48 wt. % middle distillates based on the total weight of the plastic derived oil stream 102. In embodiments, the plastic derived oil stream 102 may comprise from 5 wt. % to 25 wt. % heavy distillates, such as from 5 wt. % to 20 wt. %, from 5 wt. % to 15 wt. %, from 10 wt. % to 25 wt. %, from 10 wt. % to 20 wt. %, from 10 wt. % to 15 wt. %, or about 14 wt. % heavy distillates based on the total weight of the plastic derived oil stream 102.

The plastic derived oil 102 may be characterized by a boiling point distribution determined using standard test method ASTM D2887. In embodiments, the plastic derived oil 102 may have an initial boiling point (IBP) of from 20° C. to 100° C., such as from 20° C. to 60° C., from 20° C. to 50° C., from 25° C. to 100° C. from 25° C. to 60° C., from 25° C. to 50° C., or from 25° C. to 40° C. In embodiments, the plastic derived oil 102 may have a final boiling point (FBP) of from 300° C. to 600° C., such as from 300° C. to 500° C., from 300° C. to 450° C., from 350 to 600° C., from 350° C. to 500° C., from 350° C. to 450° C., or from 375° C. to 425° C. In embodiments, the plastic derived oil 102 may have a 50% boiling point temperature of from 150° C. to 350° C., such as from 150° C. to 300° C., from 150° C.

to 275° C., from 200° C. to 350° C., from 200° C. to 300° C., from 200° C. to 275° C., from 225° C. to 350° C., from 225° C. to 300° C., or from 225° C. to 275° C., where the 50% boiling point temperature is the temperature in the boiling point distribution at which 50 wt. % of the constituents of the plastic derived oil 102 have transitioned from the liquid phase into the vapor phase.

In embodiments, the plastic derived oil 102 may have a density of from 0.65 g/ml to 1.1 g/ml, such as from 0.65 g/ml to 1.0 g/ml, from 0.65 g/ml to 0.9 g/ml, from 0.65 g/ml to 0.8 g/ml, from 0.7 g/ml to 1.1 g/ml, from 0.7 g/ml to 1.0 g/ml, from 0.7 g/ml to 0.9 g/ml, from 0.7 g/ml to 0.8 g/ml, from 0.75 g/ml to 1.1 g/ml, from 0.75 g/ml to 1.0 g/ml, from 0.75 g/ml to 0.9 g/ml, or from 0.75 g/ml to 0.85 g/ml, as determined by ASTM D4052. In embodiments, the plastic derived oil 102 may have less than or equal to 0.1 wt. % sulfur, as determined by ASTM D4294. In embodiments, the plastic derived oil 102 may have less than 0.01 wt. % Conradson carbon, as determined according to ASTM D4530. In embodiments, the plastic derived oil 102 may have an oxygen content of from 100 ppmw to 10,000 ppmw, such as from 100 ppmw to 7,000 ppmw, from 500 ppmw to 10,000 ppmw, from 500 ppmw to 7000 ppmw, from 1000 to 10,000 ppmw, from 1000 to 7000 ppmw, or from 5000 ppm to 10,000 ppmw. In embodiments, the plastic derived oil 102 may have a moisture content (concentration of water) of less than or equal to 5000 ppmw, less than or equal to 2000 ppmw, less than or equal to 1000 ppmw, less than or equal to 500 ppmw, or less than or equal to 400 ppmw, as determined according to ASTM D6304A. In embodiments, the plastic derived oil 102 may have the properties provided in Table 1.

TABLE 1

Properties of one embodiment of the plastic derived oil 102

| Property | Units | Test Method | Value |
|---|---|---|---|
| Density | g/mL | ASTM D4052 | 0.792 |
| Total Oxygen Concentration | ppmw | Combustion based | 5540 |
| Total Chloride Concentration | ppmw | UOP 779 | 342 |
| Total Sulfur | wt. % | ASTM D4294 | 0.064 |
| Total Nitrogen | ppmw | ASTM D4629 | 1135 |
| Bromine Number | g($Br_2$)/100 g | ASTM D1159 | 43.3 |
| Silica | ppmw | UOP 407 | 0.109 |
| Sodium | ppmw | UOP 407 | 0.174 |
| Iron | ppmw | UOP 407 | 0.097 |
| Water | ppmw | ASTM D6304A | 299 |
| Conradson Carbon Residue | wt. % | ASTM D4530 | <0.01 |

Simulated Distillation Table

| Recovery (wt. %) | Units | Test Method | Temperature |
|---|---|---|---|
| SIMDIST - IBP | ° C. | ASTM D2887 | 29.4 |
| SIMDIST - 5 wt. % | ° C. | ASTM D2887 | 77.7 |
| SIMDIST - 10 wt. % | ° C. | ASTM D2887 | 107.1 |
| SIMDIST - 15 wt. % | ° C. | ASTM D2887 | 127.3 |
| SIMDIST - 20 wt. % | ° C. | ASTM D2887 | 139.9 |
| SIMDIST - 25 wt. % | ° C. | ASTM D2887 | 158.7 |
| SIMDIST - 30 wt. % | ° C. | ASTM D2887 | 173.6 |
| SIMDIST - 35 wt. % | ° C. | ASTM D2887 | 188.7 |
| SIMDIST - 40 wt. % | ° C. | ASTM D2887 | 207.9 |
| SIMDIST - 45 wt. % | ° C. | ASTM D2887 | 225.6 |
| SIMDIST - 50 wt. % | ° C. | ASTM D2887 | 240.0 |
| SIMDIST - 55 wt. % | ° C. | ASTM D2887 | 253.9 |
| SIMDIST - 60 wt. % | ° C. | ASTM D2887 | 266.2 |
| SIMDIST - 65 wt. % | ° C. | ASTM D2887 | 279.3 |
| SIMDIST - 70 wt. % | ° C. | ASTM D2887 | 293.8 |
| SIMDIST - 75 wt. % | ° C. | ASTM D2887 | 307.1 |
| SIMDIST - 80 wt. % | ° C. | ASTM D2887 | 320.2 |
| SIMDIST - 85 wt. % | ° C. | ASTM D2887 | 333.7 |
| SIMDIST - 90 wt. % | ° C. | ASTM D2887 | 347.8 |
| SIMDIST - 95 wt. % | ° C. | ASTM D2887 | 364.7 |
| SIMDIST - FBP | ° C. | ASTM D2887 | 405.3 |

The plastic derived oil 102 may be produced from solid plastic waste through melting and dehalogenation followed by pyrolysis. Referring now to FIG. 2, the systems 100 disclosed herein may further include a dehalogenation unit 10 and a pyrolysis reactor 20, both of which may be disposed upstream of the first reactor 110. The dehalogenation unit 10 may be operable to melt solid waste plastic 12 to produce a liquefied plastic stream 14. The liquefied plastic stream 14 may be passed to the pyrolysis reactor 20 downstream of the dehalogenation unit 10. The pyrolysis reactor 20 may be configured to subject the liquidized plastic stream 14 to pyrolysis to produce the plastic derived oil 102. The processes disclosed herein may include producing the plastic derived oil 102 stream from a solid waste plastic 12 by liquefying the solid plastic waste 12 in the dehalogenation unit 10 to produce a liquefied plastic stream 14, passing the liquefied plastic stream 14 to the pyrolysis reactor 20, and subjecting the liquefied plastic stream 14 to pyrolysis to produce the plastic derived oil stream 102.

The solid waste plastic 12 supplied to the dehalogenation unit 10 may comprise a plastic feedstock including mixed solid waste plastics of differing compositions. The solid waste plastic 12 may be a mixture of plastics from various polymer families. In embodiments, the solid waste plastics 12 may comprise plastics representative of one or more of the polymer families, such as but not limited to olefins, carbonates, aromatic polymers, sulfones, fluorinated hydrocarbon polymers, chlorinated hydrocarbon polymers, acrylonitriles, or combinations of these families of polymers. In embodiments, the mixed waste plastics 12 may include polyethylene (PE), polypropylene (PP), diphenylcarbonate, polystyrene (PS), polyether sulfone, polyfluoroethylene (PTFE), polyvinyl chloride (PVC), polyacrylonitrile (PAN), other polymers, or combinations of these. In embodiments, solid waste plastics 12 may be a mixture of high density polyethylene (HDPE, for example, a density of about 0.93 to 0.97 grams per cubic centimeter (g/cm$^3$), low density polyethylene (LDPE, for example, about 0.910 g/cm$^3$ to 0.940 g/cm$^3$), polypropylene (PP), linear low density polyethylene (LLDPE), polystyrene (PS), polyvinyl chloride (PVC), polyethylene terephthalate (PET), or combinations of these polymers. In embodiments, the solid waste plastics 12 may include one or more chlorinated hydrocarbons, such as PVC. The plastics of the solid waste plastics 12 may be natural, synthetic, or semi-synthetic polymers. Utilization of the solid waste plastics 12 comprising a mixture of different types of plastics and polymers may allow for recycling of solid plastics without necessitating fine sorting of the plastics into different types.

The solid waste plastics 12 may be provided in a variety of different forms. In embodiments, the solid waste plastics 12 may be in the form of a powder in smaller scale operations. In embodiments, the solid waste plastics 12 may be in the form of pellets, such as pellets with a particle size of from 1 to 5 millimeter (mm) for larger scale operations. In embodiments, the solid waste plastics 12 may be provided as chopped or ground waste plastics. In embodiments, the system 100 may include a plastic grinding unit (not shown) upstream of the dehalogenation reactor, where the plastic grinding unit may be operable to grind plastic articles into smaller pieces to produce the solid waste plastics 12. In embodiments, the solid waste plastics 12 may comprise waste plastic, manufacturing off-spec product, new plastic products, unused plastic products, or combinations of these.

The dehalogenation unit 10 may be in fluid communication with the solid waste plastics 12 and may be operable to raise the temperature of the solid waste plastics 12 to a temperature between 250° C. and 350° C. to melt the plastics and generate the liquefied plastic stream 14. When the solid waste plastics 12 include halogenated plastics, such as but not limited to PVC, melting the plastics may release hydrogen halides, such as HCl. The dehalogenation unit 10 may also be operable to scrub HCl and other halogen halides released during melting of the solid waste plastics 12. Removal of some of the chlorine, fluorine, or other halides from the solid plastic waste 12 may reduce the concentration of halides in the liquefied plastic stream 14. As a result, the liquefied plastic stream 14 may have a reduced chlorine concentration compared to the solid plastic waste 12. Reducing the concentration of organic halide compounds in the liquefied plastic stream 14 may reduce corrosion problems in the downstream pyrolysis reactor.

In embodiments, the dehalogenation reactor 10 may be operable to increase the temperature of the solid waste plastic 12 to a temperature of from 250° C. to 350° C. to melt the solid waste plastic 12 and remove at least a portion of the chlorine and other halogens from the resulting liquefied plastic stream 14. In embodiments, the dehalogenation reactor 10 may be operable to increase the temperature of the solid waste plastic 12 to a temperature of from 250° C. to 325° C., from 275° C. to 350° C., from 275° C. to 325° C., or from 300° C. to 350° C. The temperature of the dehalogenation reactor 10 may be controlled to remove HCl without cracking C—H or C—C bonds.

In embodiments, the HCl and other hydrogen halides released from the liquefied plastic stream 14 may be passed out of the dehalogenation unit 10 as a halogen-rich stream 16. The halogen-rich stream may include hydrogen halides, such as HCl, as well as hydrogen and light hydrocarbon gases, such as but not limited to mono aromatics, hydrogen, methane, and C2-C5 gases. In embodiments, the halogen-rich stream 16 may be scrubbed with water or a sodium hydroxide solution in a downstream acid gas scrubbing unit (not shown) to remove the halogen compounds from the halogen-rich stream 16. In embodiments, the hydrogen halide compounds may be scrubbed within the dehalogenation unit 10, such as by contacting the released gases with adsorbents, such as but not limited to $Al_2O_3$, zeolites, or other chemical removers. In embodiments, the dehalogenation unit 10 may include a melting reactor and an acid gas scrubber downstream of the melting reactor. In embodiments, a single unit forming the dehalogenation unit 10 may achieve both melting of the plastic solid plastic and scrubbing to remove hydrogen halides.

Referring again to FIG. 2, the pyrolysis reactor 20 may be disposed downstream of the dehalogenation unit 10 and in fluid communication with the liquefied plastic stream 14 discharged from the dehalogenation unit 10. The pyrolysis reactor 20 may be operable to increase the temperate of the liquefied plastic stream 14 to a temperature of from 300° C. to 1000° C. to convert the liquefied plastic stream 14 to the plastic derived oil stream 102. In particular, the pyrolysis of the liquefied plastic stream 14 in the pyrolysis reactor 20 may cause at least a portion of the long chain polymers in the liquefied plastic stream 14 to break apart into smaller fragments comprising organic compounds having smaller average molecular weight compared to the long chain polymers.

The specific reactor used as the pyrolysis reactor 20 can be of different types and are not limited for the purposes of the present disclosure. Typical reactor types that can be used to serve the function of the pyrolysis reactor 20 can include but are not limited to tank reactors, rotary kilns, packed beds, bubbling bed reactors, or other types of reactors. In embodiments, the pyrolysis of the liquefied plastic stream 14 in the pyrolysis reactor 20 may be performed in the presence or absence of a pyrolysis catalyst at a temperature of from 300° C. to 1000° C. In embodiments, the pyrolysis reactor 20 may operate at a low severity at a temperature less than or equal to 450° C. or at a high severity at a temperature greater than 450° C. In embodiments, the pyrolysis reactor 20 may be operated at a temperature of from 400° C. to 600° C., from 400° C. to 500° C., from 400° C. to 450° C., from 450° C. to 500° C., or from 425° C. to 475° C. In embodiments, the pyrolysis reactor 20 may be operated at a pressure in the range of 1 bar to 100 bars (100 kilopascals (kPa) to 10,000 kPa), from 1 bar to 50 bars (100 kPa to 5000 kPa), from 1 bar to 25 bars (1 kPa to 2500 kPa), or from 1 bar to 10 bars (1 kPa to 1000 kPa). Further, in various embodiments, the residence time of the liquefied plastic stream 14 in the pyrolysis reactor 20 may be from 1 second to 3600 seconds, from 60 seconds to 1800 seconds, or from 60 seconds to 900 seconds. The plastic derived oil 102 may be passed out of the pyrolysis reactor 20.

Referring again to FIG. 1, the plastic derived oil 102 may be passed to the first reactor 110. In embodiments, the first reactor 110 may be downstream of the pyrolysis reactor 20 and in fluid communication with the pyrolysis reactor 20 to pass the plastic derived oil 102 from the pyrolysis reactor 20 to the first reactor 110. The first reactor 110 may comprise an MMO catalyst 112. The first reactor 110 may be any type of reactor capable of contacting the plastic derived oil 102 with the MMO catalyst 112 at reaction conditions sufficient to cause halogen-containing organic compounds to react to form hydrogen halides and hydrocarbons and to cause the resulting hydrogen halides to be adsorbed into the MMO catalyst 112 to produce a first reactor effluent 114 having a reduced concentration of halogen-containing compounds and other contaminants compared to the plastic derived oil 102.

The first reactor 110 may be a fixed bed reactor, a fluidized bed reactor, a moving bed reactor, or other suitable type of reactor. The first reactor 110 may include one or a plurality of reactors. When the first reactor 110 comprises a plurality of reactors, the plurality of reactors may be in series or in parallel. In embodiments, the first reactor 110 may include a fixed bed reactor in which the MMO catalyst 112 is contained within a fixed catalyst bed disposed within the first reactor 110. In embodiments, the first reactor 110 may be a fluidized bed reactor in which the plastic derived oil 102 and the MMO catalyst 112 are combined together at one end of the reactor and flow co-currently through the fluidized bed reactor to a catalyst separation zone disposed at an outlet of the first reactor 110. When the first reactor 110 is a fluidized bed reactor, the first reactor 110 may be a riser reactor or a downer reactor. In embodiments, the first reactor 110 may be a riser reactor. When the first reactor 110 is a fluidized bed reactor, the used MMO catalyst, after being separated from the first reactor effluent 114, may be regenerated in a catalyst regenerator. When the first reactor 110 is a fixed bed reactor, the MMO catalyst 112 may be regenerated in place within the first reactor 110. Multiple first reactors 110 in parallel may facilitate continuous operation of the first reactor 110 system while taking one or more of the plurality of fixed bed reactors offline to regenerate the MMO catalyst 112 when needed.

The MMO catalyst 112 may comprise a plurality of metal oxides, where each of the metal oxides are randomly distributed throughout the MMO catalyst. The metal oxides of the MMO catalyst 112 may be metal oxides that promote reaction of halogen-containing organic compounds to produce hydrogen halides and organic compounds and that adsorb hydrogen halides, such as but not limited to HCl. The plurality of metal oxides of the MMO catalyst may include oxides of alkali metals, alkaline earth metals, metals in groups 3-13 of the International Union of Pure and Applied Chemistry (IUPAC) periodic table, or combinations of these. In embodiments, the MMO particles may also include oxides of metalloids, such as oxides of silicon. As used herein, the term "metal oxide" includes metalloid oxides. In embodiments, the plurality of metal oxides of the MMO particles may include a combination of oxides of calcium, magnesium, sodium, iron, zirconium, cerium, aluminum, tungsten, molybdenum, titanium, silicon, or combinations thereof. In embodiments, the MMO catalyst comprises a plurality of the metal oxides selected from the group consisting of $Fe_2O_3$, $ZrO_2$, $CeO_2$, $Al_2O_3$, $TiO_2$, CaO, $SiO_2$, $Na_2O$, MgO, and combinations thereof.

The MMO catalyst may comprises a plurality of mixed metal oxide (MMO) particles. Each of the plurality of MMO particles may include a plurality of metal oxides that are different from one another. The MMO particles may comprise one or more of the metal oxides randomly distributed throughout the MMO particles. The MMO particles of the mixed metal oxide catalyst 112 may include $Fe_2O_3$ as one of the plurality of metal oxides. In embodiments, the MMO particles may include from 0 wt. % to 95 wt. % $Fe_2O_3$, such as from 0 wt. % to 90 wt. %, from 0 wt. % to 75 wt. %, from 0 wt. % to 60 wt. %, from 1 wt. % to 95 wt. %, from 1 wt. % to 90 wt. %, from 1 wt. % to 75 wt. %, from 1 wt. % to 60 wt. %, from 5 wt. % to 95 wt. %, from 1 wt. % to 90 wt. %, from 1 wt. % to 75 wt. %, from 1 wt. % to 60 wt. %, from 15 wt. % to 95 wt. %, from 15 wt. % to 90 wt. %, from 15 wt. % to 75 wt. %, or from 15 wt. % to 60 wt. % $Fe_2O_3$ based on the total weight of the MMO particles. The MMO particles may include $ZrO_2$ as one of the plurality of metal oxides. In embodiments, the MMO particles may include from 0 wt. % to 20 wt. % $ZrO_2$, such as from 0 wt. % to 15 wt. %, from 0 wt. % to 12.5 wt. %, from 0 wt. % to 10 wt. %, from 1 wt. % to 20 wt. %, from 1 wt. % to 15 wt. %, from 1 wt. % to 10 wt. %, or from 5 wt. % to 20 wt. % $ZrO_2$ based on the total weight of the MMO particles. The MMO particles may include $CeO_2$ as one of the plurality of metal oxides. In embodiments, the MMO particles may include from 0 wt. % to 10 wt. % $CeO_2$, such as from 0 wt. % to 7.5 wt. %, from 0 wt. % to 5 wt. %, from 0.1 wt. % to 10 wt. %, from 0.1 wt. % to 7.5 wt. %, from 0.1 wt. % to 5 wt. %, from 0.5 wt. % to 10 wt. %, from 0.5 wt. % to 7.5 wt. %, from 0.5 wt. % to 5 wt. %, from 1 wt. % to 10 wt. %, or from 1 wt. % to 5 wt. % of the $CeO_2$ based on the total weight of the MMO particles. The MMO particles may include $Al_2O_3$ (alumina) as one of the plurality of metal oxides. In embodiments, the MMO particles may include from 1 wt. % to 50 wt. % $Al_2O_3$, such as from 1 wt. % to 40 wt. %, from 1 wt. % to 30 wt. %, from 1 wt. % to 20 wt. %, from 5 wt. % to 50 wt. %, from 5 wt. % to 40 wt. %, from 5 wt. % to 30 wt. %, from 5 wt. % to 20 wt. %, from 8 wt. % to 50 wt. %, from 8 wt. % to 40 wt. %, from 8 wt. % to 30 wt. %, or from 8 wt. % to 20 wt. % of the $Al_2O_3$ based on the total weight of the MMO particles. The MMO particles may include $TiO_2$ as one of the plurality of metal oxides. In embodiments, the MMO particles may include from 0 wt. % to 15 wt. % $TiO_2$, such as from 0 wt. % to 10 wt. %, from 0 wt. % to 5 wt. %, from 0.1 wt. % to 15 wt. %, from 0.1 wt. % to 10 wt. %, from 0.1 wt. % to 5 wt. %, from 1 wt. % to 15 wt. %, from 1 wt. % to 10 wt. %, from 1 wt. % to 5 wt. %, from 5 wt. % to 15 wt. %, or from 5 wt. % to 10 wt. % of the $TiO_2$ based on the total weight of the MMO particles.

The MMO particles may include CaO as one of the plurality of metal oxides. In embodiments, the MMO particles may include from 0 wt. % to 50 wt. % of the CaO, such as from 0 wt. % to 40 wt. %, from 0 wt. % to 35 wt. %, from 0 wt. % to 30 wt. %, from 2 wt. % to 50 wt. %, from 2 wt. % to 40 wt. %, from 2 wt. % to 35 wt. %, from 2 wt. % to 30 wt. %, from 2 wt. % to 15 wt. %, from 10 wt. % to 50 wt. %, from 10 wt. % to 40 wt. %, from 10 wt. % to 35 wt. %, from 10 wt. % to 30 wt. %, or from 14 wt % to 50 wt. % of the CaO based on the total weight of the MMO particles. The MMO particles may include MgO as one of the plurality of metal oxides. In embodiments, the MMO particles may include from 0 wt. % to 20 wt. % MgO, such as from 0 wt. % to 18 wt. %, from 0 wt. % to 15 wt. %, from 0.1 wt. % to 20 wt. %, from 0.1 wt. % to 18 wt. %, from 0.1 wt. % to 15 wt. %, from 1 wt. % to 20 wt. %, from 1 wt. % to 18 wt. %, or from 1 wt. % to 15 wt. % of the MgO based on the total weight of the MMO particles. The MMO particles may include $Na_2O$ as one of the plurality of metal oxides. In embodiments, the MMO particles may include from 0 wt. % to 10 wt. % $CeO_2$, such as from 0 wt. % to 7.5 wt. %, from 0 wt. % to 5 wt. %, from 0.1 wt. % to 10 wt. %, from 0.1 wt. % to 7.5 wt. %, from 0.1 wt. % to 5 wt. %, from 0.5 wt. % to 10 wt. %, from 0.5 wt. % to 7.5 wt. %, from 0.5 wt. % to 5 wt. %, from 1 wt. % to 10 wt. %, or from 1 wt. % to 5 wt. % of the $Na_2O$ based on the total weight of the MMO particles. The MMO particles may include $SiO_2$ as one of the plurality of metal oxides. In embodiments, the MMO particles may include from 0 wt. % to 50 wt. % $SiO_2$, such as from 0 wt. % to 40 wt. %, from 0 wt. % to 30 wt. %, from 1 wt. % to 50 wt. %, from 1 wt. % to 40 wt. %, from 1 wt. % to 30 wt. %, from 3 wt. % to 50 wt. %, from 3 wt. % to 40 wt. %, from 3 wt. % to 30 wt. %, from 6 wt. % to 50 wt. %, or from 6 wt. % to 40 wt. % of the $SiO_2$ based on the total weight of the MMO particles.

In embodiments, the MMO catalyst may comprise MMO particles comprising red mud, cement raw meal, cement slag, co-precipitated MMO particles, or combinations of these. In embodiments, the MMO particles of the MMO catalyst may comprise red mud that comprises from 5 wt. % to 60 wt. % $Fe_2O_3$, from 5 wt. % to 30 wt. % $Al_2O_3$, from 0 wt. % to 15 wt. % $TiO_2$, from 2 wt. % to 14 wt. % CaO, from 3 wt. % to 50 wt. % $SiO_2$, and from 1 wt. % to 10 wt. % $Na_2O$ based on the total weight of the red mud. In embodiments, the MMO particles of the MMO catalyst may comprise cement raw meal that comprises from 1 wt. % to 18 wt. % $Fe_2O_3$, from 40 wt. % to 50 wt. % $Al_2O_3$, from 35 wt. % to 40 wt. % CaO, and from 5 wt. % to 10 wt. % $SiO_2$ based on the total weight of the cement raw meal. In embodiments, the MMO particles of the MMO catalyst may comprise cement slag that comprises from 8 wt. % to 24 wt. % $Al_2O_3$, from 30 wt. % to 50 wt. % CaO, from 28 wt. % to 38 wt. % $SiO_2$, and from 1 wt. % to 18 wt. % MgO based on the total weight of the cement slag. In embodiments, the MMO particles of the MMO catalyst may comprise co-precipitated MMO catalyst particles comprising from 60 wt. % to 95 wt. % $Fe_2O_3$, from 1 wt. % to 20 wt. % $ZrO_2$, from 0.1 wt. % to 10 wt. % $CeO_2$, and from 1 wt. % to 20 wt. % $Al_2O_3$ based on the total weight of the co-precipitated MMO catalyst.

In embodiments, the MMO catalyst may comprise a mixture of MMO particles, where each of the MMO particles comprises one or more of the metal oxide constituents of the MMO catalyst. In embodiments, the MMO particles may include the plurality of metal oxides mixed and fused or agglomerated together to form the MMO particles comprising a homogeneous solid mixture of the metal oxides instead of one or more metal oxides deposited on a surface of a support material. In embodiments, the MMO particles may be prepared by a co-precipitation method to produce the MMO particles comprising each of the plurality of different metal oxides distributed throughout the MMO particles. In embodiments, the MMO particles may be pulverized to form a powder.

In embodiments, the MMO particles may be nanoparticles, which may have a largest dimension of from 20 nm to 200 nm. In embodiments, the MMO particles may be non-porous. Without being limited by theory, it is believed that hydrocarbons may only interact with the surface of the MMO particles. Thus, the increased surface area provided by the nano-particulate nature of the mixed metal oxide catalyst may help to achieve sufficient reaction rates.

The MMO particles, in the form of a powder, may be combined with other materials, such as but not limited to binder materials, extrusion additives, or other materials, extruded, and calcined to form the mixed metal oxide catalyst 112 in the form of catalyst pellets. In embodiments, the MMO particles, in powder form, may be combined and mixed with a binder material and methylcellulose to produce a solid mixture. The binder materials may comprise silica, alumina, silica-alumina, a clay, or any combinations of these. The alumina may comprise an acid peptized alumina. The silica-alumina may comprise an amorphous silica-alumina. Clays may include, but are not limited to, kaolin, montmorillonite, halloysite, bentonite, or combinations of these. In embodiments, the binder material may comprise bentonite, silica, or combinations of these. In embodiments, the mixed metal oxide catalyst 112 may comprise bentonite as the binder. The methylcellulose may be added to the solid mixture to facilitate extrusion, but may be burned off during calcination. In embodiments, the mixed metal oxide catalyst 112 pellets, after calcining, may comprise, consist of, or consist essentially of the MMO particles and the binder.

Referring again to FIG. 1, in embodiments, a supplemental feed stream 106 may be introduced to the first reactor 110 or combined with the plastic derived oil 102 upstream of the first reactor 110. In embodiments, the hydrocarbons introduced to the first reactor 110 may comprise from 0.1 wt. % to 100 wt. % of the plastic derived oil 102, such as from 20 wt. % to 100 wt. %, from 40 wt. % to 100 wt. %, from 60 wt. % to 100 wt. %, from 80 wt. % to 100 wt. %, or substantially 100 wt. % plastic derived oil based on the total weight of hydrocarbons introduced to the first reactor 110. When the concentration of the plastic derived oil 102 in the feed to the first reactor 110 is less than 100 wt. %, then the remainder may comprise the supplemental feed stream 106. The supplemental feed stream 106 may comprise hydrocarbons and may be a conventional fluid catalytic cracking feedstock stream, such as but not limited to hydrocracker bottoms, virgin or hydrotreated vacuum gas oil, deasphalted oil (DAO), coker gas oil, cycle oil, visbreaker oil, atmospheric residue, vacuum residue, or combinations of these. It is further noted, when the first reactor 110 is a fluidized bed reactor, the catalyst-to-oil ratio for the first reactor 110 is may be calculated as the flow rate of the MMO catalyst 112 entering the first reactor 110 divided by a total flow rate of hydrocarbons into the first reactor 110, which includes the plastic derived oil stream 102 and any supplemental feed stream 106. The processes disclosed herein may include passing supplemental feed stream 106 to the first reactor 110 or combining the supplemental feed stream 106 with the plastic derived oil stream 102 upstream of the first reactor 110.

The first reactor 110 may be operable to contact the plastic derived oil 102, and optionally the supplemental feed stream 106, with the MMO catalyst 112 at a temperature of from 300 (degrees Celsius) ° C. to 450° C. and at a pressure of from 101 kilopascals (kPa) to 303 kPa, or at atmospheric pressure (~101 kPa).

In embodiments, the first reactor 110 may be a fluidized bed reactor, and the first reactor may be operable to contact the plastic derived oil stream 102, and optionally the supplemental feed stream 106, with the MMO catalyst at a catalyst-to-oil weight ratio of greater than or equal to 0.2, such as from 0.2 to 10. The catalyst-to-oil weight ratio in the first reactor 110 may be equal to an average ratio of a weight of the MMO catalyst 112 divided by a weight of the hydrocarbons in the first reactor 110 averaged over time at steady state.

The catalyst-to-oil weight ratio in the first reactor 110 may be adjusted based on the concentration of halogen-containing compounds in the plastic derived oil 102. In particular, the catalyst-to-oil weight ratio in the first reactor 110 may be increased in response to greater concentrations of halogen-containing compounds in the plastic derived oil stream 102 and reduced in response to lesser concentrations of halogen-containing compounds in the plastic derived oil 102. In embodiments, the processes herein may include adjusting the catalyst-to-oil weight ratio in the first reactor 110 based on a concentration of halogen-containing compounds in the plastic derived oil stream 102. Adjusting the catalyst-to-oil weight ratio in the first reactor 110 may include determining a concentration of halogen-containing compounds in the plastic derived oil stream 102 and adjusting a flow rate of the plastic derived oil stream 102, the MMO catalyst 112, or both to the first reactor 110. The catalyst-to-oil weight ratio in the first reactor 110 may be adjusted in proportion to the concentration of halogen-containing compounds in the plastic derived oil stream 102.

Referring again to FIG. 1, the first reactor effluent 114 may be passed out of the first reactor 110. In embodiments, the first reactor effluent 114 may be separated from the MMO catalyst 112 at or proximate to an outlet of the first reactor 110. In embodiments, the first reactor 110 may be a fluidized bed reactor and the first reactor effluent 114 may be separated from the MMO catalyst 112 in a catalyst separation zone (not shown) proximate to the outlet of the first reactor 110. The catalyst separation zone may include one or more solid-fluid separators.

The first reactor effluent 114 may have a concentration of halogen-containing compounds less than the plastic derived oil 102 upstream of the first reactor 110. In embodiments, the first reactor effluent 114 may have a concentration of halogen-containing compounds of less than 100 ppmw, such as less than 50 ppmw, less than 20 ppmw, less than 10 ppmw. In embodiments, the first reactor effluent 114 may have a concentration of halogen-containing compounds of from 1 ppmw to 100 ppmw, from 1 ppmw to 80 ppmw, from 1 ppmw to 50 mm, from 1 ppmw to 20 ppmw, from 1 ppmw to 10 ppmw, from 5 ppmw to 100 ppmw, from 5 ppmw to 80 ppmw, from 5 ppmw to 50 ppmw, from 5 ppmw to 20 ppmw, from 5 ppmw to 10 ppmw, from 10 ppmw to 100 ppmw, from 10 ppmw to 80 ppmw, from 10 ppmw to 50 mm, from 10 ppmw to 20 ppmw, from 20 ppmw to 100 ppmw, from 20 ppmw to 80 ppmw, from 20 ppmw to 50 mm, from 50 ppmw to 100 ppmw, or from 50 ppmw to 80 ppmw based on the total molar flow rate of the first reactor effluent 114.

Referring again to FIG. 1, the first reactor effluent 114 may be passed to the adsorption unit 120 disposed downstream from the first reactor 110. The adsorption unit 120 may be operable to contact the first reactor effluent 114 with an adsorbent in one or more adsorbent beds to remove residual halogen-containing compounds, such as chloride compounds, to produce a treated first reactor effluent 122. The adsorption unit 120 may comprise an adsorbent in at least one adsorbent bed. In embodiments, the adsorption unit 120 may include a plurality of adsorbent beds operated on parallel so that one or more adsorbent beds can be operated while one or more other adsorbent beds are taken offline for regeneration or replacement of the adsorbents. The adsorbents may include but are not limited to alumina, zeolites, activated carbon, metal oxides capable of adsorbing hydrogen halides and other halogen-containing compounds, or combinations of these.

The treated first reactor effluent 122 may be passed out of the adsorption unit 120. The treated first reactor effluent 122 may have a concentration of halogen-containing compounds less than the concentration of halogen-containing compounds in the first reactor effluent 114. In embodiments, the treated first reactor effluent 122 may have a concentration of halogen-containing compounds less than 50 ppmw, less than 20 ppmw, less than 10 ppmw, less than 5 ppmw, less than 1 ppmw, from 0 ppmw to 50 ppmw, from 0 ppmw to 20 ppmw, from 0 ppmw to 10 ppmw, from 0 ppmw to 5 ppmw, from 0 ppmw to 1 ppmw, from 0 ppmw to 0.5 ppmw, or from 0 ppmw to 0.1 ppmw based on the total molar flow rate of the treated first reactor effluent 122.

Referring again to FIG. 1, the treated first reactor effluent 122 may be passed to a first reactor effluent separation system 130, which may be disposed downstream from the first reactor 110, the adsorption unit 120, or both and upstream of the second reactor 140. In embodiments, the treated first reactor effluent 122 may be passed from the adsorption unit 120 to the first reactor effluent separation system 130. The first reactor effluent separation system 130 may be operable to separate the treated first reactor effluent 122 to produce a light effluent 132 and a heavy stream 134. The first reactor effluent separation system 130 can include one or a plurality of separation units, which, collectively, operate to separate the treated first reactor effluent 122 into the light effluent 132 and the heavy stream 134. The processes disclosed herein may include separating the treated first reactor effluent 122 in the first reactor effluent separation system 130 to produce the light effluent 132 and the heavy stream 134 and passing the heavy stream 134 to the second reactor 140. The first reactor effluent separation system 130 may be operated at a cut point temperature of from 0 (zero) ° C. to 4° C. to condense liquid fractions comprising hydrocarbons having greater than or equal to 5 carbon atoms.

The light effluent 132 may comprise constituents of the treated first reactor effluent 122 having boiling point temperatures less than or equal to 0° C. or less than or equal to 4° C. The light effluent 132 may include greater than or equal to 90%, greater than or equal to 95%, greater than or equal to 98%, greater than or equal to 99%, or even greater than or equal to 99.5% by weight of the constituents of the treated first reactor effluent 122 having boiling point temperatures less than the cut point temperature of the first reactor effluent separation system 130. The light effluent 132 may include non-condensable hydrocarbon gases, such as but not limited to hydrocarbons having from 1-4 carbon atoms. The light effluent 132 may include alkanes, alkenes, and alkynes having from 1-4 carbon atoms, such as but not limited to methane, ethane, ethylene, propane, propylene, butane, isobutane, mixed butenes, or combinations of these. The light effluent 132 may also include other gaseous compounds such as but not limited to any hydrogen produced in the first reactor 110 or inert gases, such as but not limited to nitrogen, passing through the first reactor 110.

The heavy stream 134 may comprise the constituents from the treated first reactor effluent 122 having boiling point temperatures greater than 0° C. or greater than 4° C. The heavy stream 134 may include greater than or equal to 90%, greater than or equal to 95%, greater than or equal to 98%, greater than or equal to 99%, or even greater than or equal to 99.5% by weight of the constituents of the treated first reactor effluent 122 having boiling point temperatures greater than the cut point temperature of the first reactor effluent separation system 130, such as greater than 4° C. The heavy stream 134 may comprise hydrocarbons having greater than or equal to 5 carbon atoms. The heavy stream 134 may be passed from the first reactor effluent separation system 130 to the second reactor 140. The light effluent 132 may be passed downstream to the product separation system 150.

Referring again to FIG. 1, the heavy stream 134 may be passed to the second reactor 140. The second reactor 140 may be downstream of the first reactor 110, the adsorption unit 120, and the first reactor effluent separation system 130.

In embodiments, the second reactor 140 may be downstream of the first reactor effluent separation system 130 and in fluid communication therewith to pass the heavy stream 134 directly from the first reactor effluent separation system 130 to the second reactor 140. The second reactor 140 may be a cracking reactor and may comprise a cracking catalyst 142. The second reactor 140 may be any type of reactor capable of contacting the heavy stream 134 with the cracking catalyst 142 at reaction conditions sufficient to cause at least a portion of the hydrocarbons in the heavy stream 134 to undergo cracking reactions to produce a second reactor effluent 144 comprising a greater concentration of light olefins, light aromatic compounds, naphtha range hydrocarbons, gasoline or fuel blending constituents, or combinations of these compared to the heavy stream 134.

The second reactor 140 may be a fixed bed reactor, a fluidized bed reactor, a moving bed reactor, or other suitable type of reactor. The second reactor 140 may include one or a plurality of reactors. When the second reactor 140 comprises a plurality of reactors, the plurality of reactors may be in series or in parallel. In embodiments, the second reactor 140 may include a fixed bed reactor in which the cracking catalyst 142 is contained within a fixed catalyst bed disposed within the second reactor 140. In embodiments, the second reactor 140 may be a fluidized bed reactor in which the heavy stream 134 and the cracking catalyst 142 are combined together at one end of the reactor and flow co-currently through the fluidized bed reactor to a catalyst separation zone disposed at an outlet of the second reactor 140. When the second reactor 140 is a fluidized bed reactor, the second reactor 140 may be a riser reactor or a downer reactor. In embodiments, the second reactor 140 may be a riser reactor. When the second reactor 140 is a fluidized bed reactor, the used cracking catalyst, after being separated from the second reactor effluent 144, may be regenerated in a catalyst regenerator. When the second reactor 140 is a fixed bed reactor, the cracking catalyst 142 may be regenerated in place within the second reactor 140. Multiple second reactors 140 in parallel may facilitate continuous operation of the second reactor 140 system while taking one or more of the plurality of fixed bed reactors offline to regenerate the cracking catalyst 142 when needed.

The cracking catalyst 142 utilized in the second reactor 140 may be any conventional cracking catalyst known to those skilled in the art. In embodiments, the cracking catalyst 142 may comprise a zeolite catalyst, such as but not limited to a USY zeolite, a ZSM-5 zeolite, or a combination of multiple types of suitable zeolite catalysts. Alternatively, or additionally, the cracking catalyst 142 may comprise other suitable solid acid catalysts. In embodiments, the cracking catalyst 142 may comprise fresh catalyst, regenerated catalyst, or combinations of fresh and regenerated catalyst. In embodiments, the cracking catalyst 142 may comprise one or more binders, cracking promoters, matrix materials, or other constituents to modify the physical or chemical properties such as catalyst attrition index and catalyst density, depending on the type of reactor used for the second reactor 140. In embodiments, the solid cracking catalyst 142 may be a USY zeolite and may include a ZSM-5 cracking additive to enhance light olefin yield. Other cracking catalysts may also be suitable for the cracking catalyst 142 in the second reactor 140.

The second reactor 140 may be operable to contact the heavy stream 134 with the cracking catalyst 142 at a temperature of from 500° C. to 650° C. and at a pressure of from 101 kPa to 303 kPa, or at about 101 kPa (atmospheric pressure). In embodiments, the second reactor 140 may be a fluidized bed reactor, and the second reactor 114 may be operable to contact the heavy stream 134 with the cracking catalyst 142 at a catalyst-to-oil weight ratio of greater than or equal to 2, such as from 2 to 20. The catalyst-to-oil weight ratio in the second reactor 140 may be equal to an average ratio of a weight of the cracking catalyst 142 divided by a weight of the hydrocarbons in the second reactor 140 averaged over time at steady state. The processes disclosed herein may include contacting at least a portion of the treated first reactor effluent 122, such as the heavy stream 134, with the cracking catalyst 134 in the second reactor 140 at a temperature of from 500° C. to 650° C., at a pressure of 101 kPa (1 atm), and at a catalyst-to-oil weight ratio of 2.

Referring to FIG. 1, the second reactor effluent 144 may be passed out of the second reactor 140. The second reactor effluent 144 may comprise a greater concentration of light olefins, light aromatic compounds, naphtha range hydrocarbons, or combinations of these constituents compared to the heavy stream 134. The second reactor effluent 144 may be passed to the product separation system 150. The light effluent 132 may also be passed to the product separation system 150. The second reactor effluent 144 and the light effluent 132 may be combined upstream of the product separation system 150 or may be passed separately to the product separation system 150 and combined within the product separation system 150. In embodiments, the light effluent 132 may be passed directly from the first reactor effluent separation system 130 to the product separation system 150, and the second reactor effluent 144 may be passed directly from the second reactor 140 to the product separation system 150.

In embodiments, the combination of the second reactor effluent 144 and the light effluent 132 may comprises at least 50 wt. % light olefins and naphtha range hydrocarbons based on the total combined weight of the second reactor effluent 144 and light effluent 132. For purposes of the present disclosure, the term "naphtha range hydrocarbons" or just "naphtha" refers to hydrocarbons having boiling point temperatures of from 25° C. to 221° C., the term "middle distillate" refers to hydrocarbons having boiling point temperatures of from 221° C. to 343° C., and the term "heavy distillate" or "bottom stream" refers to hydrocarbons having boiling point temperatures greater than 343° C. In embodiments, the combination of the second reactor effluent 144 and the light effluent 132 may comprise at least 55 wt. %, at least 60 wt. %, at least 65 wt. %, at least 70 wt. %, or at least 75 wt. % of light olefins and naphtha range hydrocarbons based on the total combined weight of the second reactor effluent 144 and light effluent 132. In embodiments, the combination of the second reactor effluent 144 and the light effluent 132 may comprise at least 20 wt. %, at least 25 wt. %, at least 30 wt. %, at least 32 wt. %, at least 34 wt. %, or at least 36 wt. % of light olefins based on the total combined weight of the second reactor effluent 144 and light effluent 132. Additionally, in embodiments, the combination of the second reactor effluent 144 and the light effluent 132 may comprise at least 30 wt. %, at least 35 wt. %, at least 40 wt. %, or at least 42 wt. % of naphtha range hydrocarbons based on the total combined weight of the second reactor effluent 144 and light effluent 132. In embodiments, the combination of the second reactor effluent 144 and the light effluent 132 may comprise less than 20 wt. % of middle distillate and heavy distillate, less than 18 wt. % of middle distillate and heavy distillate, less than 16 wt. % of middle distillate and heavy distillate, less than 10 wt. % of the middle distillate and heavy distillate or even less than 5 wt. % of middle distillate and heavy distillate based on the total combined weight of the second reactor effluent 144 and light effluent 132.

The combination of the second reactor effluent 144 and the light effluent 132 may be separated in the product separation system 150 to produce at least one product stream. The product separation system 150 may be disposed downstream of the second reactor 140 and downstream of the first reactor effluent separation system 130. The product separation system 150 can include one or a plurality of separation units, which, collectively, operate to separate the second reactor effluent 144 and the light effluent 132 into the plurality of product streams. In embodiments, the product separation system 150 may include one or more fractionation units. Other types of separation units are contemplated, such as but not limited to extraction units, distillation units, crystallization units, or other units. The product separation system 150 may be in fluid communication with the second reactor 140 and the first reactor effluent separation system 130 to pass the second reactor effluent 144 and the light stream 132 directly to the product separation system 150.

The plurality of product streams can include one or more light olefin streams 152 comprising olefin compounds having from 2-4 carbon atoms. The plurality of product streams can include a naphtha stream (not shown) comprising constituents having boiling point temperatures of from 25° C. to 222° C. The naphtha stream may contain light aromatic compounds and gasoline components. In embodiments, the product separation system 150 may be operable to further separate the naphtha stream to produce a light aromatics stream 154 and a gasoline stream 156. The light aromatics stream 154 may include aromatic compounds having from 6 to 8 carbon atoms, such as benzene, toluene, xylenes, and/or ethylbenzene, which may be used as chemical intermediates for producing circular polymer materials (polymers made from recovered hydrocarbons instead of hydrocarbons produced from subterranean sources and therefore having a lower environmental footprint). The gasoline stream 156 may include other hydrocarbon compounds suitable for use as fuel blending components. The gasoline stream 156 comprises low carbon footprint fuel components, where the low carbon footprint comes from producing the fuel components from recovered hydrocarbons instead of from hydrocarbons produced from subterranean sources. In embodiments, the product separation system 150 may include an aromatics recovery complex operable to separate the naphtha stream into the light aromatic stream 154 and the gasoline stream 156.

The plurality of product streams from the product separation system 150 may further include a bottom stream 158 comprising middle distillates and heavy distillates, such as hydrocarbon compounds having boiling point temperatures greater than 221° C. In embodiments, the bottom stream 158 may be further separated into middle distillates and heavy distillates. In embodiments, the product separation system 150 may further operable to produce a light gas stream (not shown) comprising light gases such as but not limited to hydrogen, methane, or both produced in the first reactor 110, the second reactor 140, or both. In embodiments, the product separation system 150 may be further operable to produce a light paraffin stream comprising saturated hydrocarbons having from 2 to 4 carbon atoms (ethane, propane, butane, and isobutane). Other product streams may be produced by the product separation system 150.

Referring again to FIG. 1, the system 100 can be used in a process for upgrading plastic derived oil 102. The process for upgrading the plastic derived oil 102 may include providing the plastic derived oil 102 stream comprising hydrocarbons and from 10 parts per million by weight (ppmw) to 500 ppmw by halogen-containing compounds based on the total weight of the plastic derived oil 102. The process may further include contacting the plastic derived oil 102 stream with the MMO catalyst 112 in the first reactor 110 at reaction conditions. Contact of the plastic derived oil 102 stream with the MMO catalyst 112 at reaction conditions may removes halogens compounds from the plastic derived oil 102 stream to produce a first reactor effluent 114 comprising less than 100 ppmw halogen-containing compounds based on the total weight of the first reactor effluent 114. The first reactor 110 may have any of the configurations, MMO catalysts, operating conditions, or other features described in the present disclosure for the first reactor 110. The MMO catalyst 112 may react with organic halide compounds to produce hydrogen halides, and the hydrogen halides may then be adsorbed by the MMO catalyst 112, downstream adsorbents, or both.

The processes of the present disclosure may further include contacting the first reactor effluent 114 with the adsorbents in an adsorption unit 120 disposed downstream of the first reactor 110 to produce the treated first reactor effluent 122. The adsorption unit 120 may have any of the adsorbents or other features discuss in the present disclosure for the adsorption unit 120. The process may further include passing at least a portion of the treated first reactor effluent 122 to the second reactor 140 disposed downstream of the first reactor 110. In embodiments, all of the treated first reactor effluent 122 may be passed to the second reactor 140. In embodiments, the treated first reactor effluent 122 may be separated in the first reactor effluent separation system 130, which may be disposed between the adsorption unit 120 and the second reactor 140, to produce a light effluent 132 and a heavy stream 134.

The processes may include contacting at least a portion of or all of the treated first reactor effluent 122 with the cracking catalyst 142 in the second reactor 140. The second reactor may have any of the configurations, cracking catalysts, operating conditions, or other features described in the present disclosure for the first reactor 110. The cracking catalyst 142 is different from the MMO catalyst and can be any of the cracking catalysts discussed in the present disclosure. Contacting all or a portion of the treated first reactor effluent 122, such as heavy stream 134, with the cracking catalyst 142 may causes at least a portion of hydrocarbons from the treated first reactor effluent 122 to undergo catalytic cracking to produce the second reactor effluent 144. The second reactor effluent 144 may have a greater concentration of light olefins, such as but not limited to ethylene, propylene, or both; light aromatics; naphtha range hydrocarbons; gasoline constituents; or combinations thereof compared the heavy stream 134.

The processes of the present disclosure may further include separating the second reactor effluent 144 or the second reactor effluent 144 and light effluent 132 in the product separation system 150 to produce a plurality of product streams, such as but not limited to an ethylene stream, a propylene stream, a mixed butenes stream, a BTX stream, a naphtha stream, a gasoline stream, or combinations thereof. In embodiments, the product streams may include one or more light olefin streams 152, a light aromatic stream 154, a gasoline stream 156, a bottom stream 158, or combinations thereof.

Referring now to FIG. 2, in embodiments, the first reactor 110 and the second reactor 140 may each be fluidized bed reactors. The fluidized bed reactors of the first reactor 110, the second reactor 140, or both may be riser reactors, downer reactors, or both. When the first reactor 110 and the second reactor 140 are fluidized bed reactors, the system 100 may include a single catalyst regenerator 160 and a catalyst separator 164 disposed downstream of the single catalyst regenerator 160. The processes disclosed herein may include separating the first reactor effluent 114 from a used MMO catalyst 116 at an outlet end of the first reactor 110, separating the second reactor effluent 144 from a used cracking catalyst 146 at an outlet end of the second reactor 140, and passing the used MMO catalyst 116 and the used cracking catalyst 146 to the single catalyst regenerator 160, where the used MMO catalyst 116 and the used cracking catalyst 146 are mixed together in the single catalyst regenerator 160 to produce a used catalyst mixture. The processes may then include regenerating the used catalyst mixture in the single catalyst regenerator 160 to produce a regenerated catalyst mixture 162. The regenerated catalyst mixture 162 may then be separated in the catalyst separator 164 to produce a regenerated MMO catalyst 112 and a regenerated cracking catalyst 142. The regenerated MMO catalyst 112 may be passed back to the first reactor 110, and the regenerated cracking catalyst 142 may be passed back to the second reactor 140.

As discussed, in embodiments, the first reactor 110 and the second reactor 140 may be a fluidized bed reactor. Referring now to FIG. 3, one embodiment of a fluidized bed reactor 300 that comprises a riser reactor (upflow reactor) is schematically depicted. In a riser reactor, the catalyst and reactants flow co-currently in an upward direction through the reaction zone. Although described in the context of riser reactors, it is understood that the first reactor, the second reactor, or both may be a downer (downflow) fluidized bed reactor. In a downer or downflow fluidized bed reactor, the catalyst and reactants flow co-currently in the downward direction. Upward and downward are relative to the direction of the force of gravity. The fluidized bed reactor 300 can include a riser 302, a reaction zone 304 downstream of the riser 302, and a separation zone 306 downstream of the reaction zone 304. In operation of the fluidized bed reactor 300 of FIG. 3, the hydrocarbon feed 310 is introduced to the riser 302. For the first reactor 110, the hydrocarbon feed 310 is the plastic derived oil 102, and for the second reactor 140, the hydrocarbon feed 310 would be the heavy stream 134. In embodiments, the hydrocarbon feed 310 may be combined with steam (not shown) upstream of the riser 302. The hydrocarbon feed 310 may be combined with an effective quantity of heated catalyst 320 in the riser 302, where the catalyst 320 may be new catalyst or regenerated catalyst. For the first reactor 110, the catalyst 320 may be new or regenerated MMO catalyst 112, and for the second reactor 140, the catalyst 320 may be new or regenerated cracking catalyst 142.

The hydrocarbon feed 310 and the catalyst 320 (with optional steam) are contacted in the riser 302 and passed upward through the riser 302 into the reaction zone 304. In the riser 302 and the reaction zone 304, the hydrocarbons from the hydrocarbon feed 310 are contacted with the catalyst 320 at reaction conditions, which may cause at least a portion of the hydrocarbons to undergo one or more chemical reactions to produce a reaction mixture comprising a reactor effluent and the used catalyst. The reaction mixture comprising the used catalyst and reactor effluent may then be passed to the separation zone 306 downstream of the reaction zone 304. In the separation zone 306, the reaction mixture is separated to produce the reactor effluent 312 and the used catalyst 322. The separation zone 306 may include one or a plurality of solid-fluid separation devices, which may have any suitable configuration known in the art. Solid-fluid separation devices may include catalyst deflectors, freeboard zones, cyclones, filters, or other type of solid-fluid separation devices.

During the reaction, the catalyst 320 can become coked resulting in used catalyst 322, and the coke deposits can reduce access to the active catalytic sites on the used catalyst 322. The used catalyst 322 may also have a reduced temperature compared to the catalyst 320 introduced to the riser 302. The used catalyst 322 from each separation zone 306 may be passed to a regenerator, as will be discussed in further detail herein.

Referring again to FIG. 2, the first reactor 110 may be a fluidized bed reactor, such as a riser reactor. The plastic derived oil 102, or portion thereof, and the MMO catalyst 112 may be introduced to an inlet of the riser of the first reactor 110. The plastic derived oil 102 and the MMO catalyst 112 may be contacted in the riser reactor and may travel together through the riser and reaction zone of the first reactor 110. The plastic derived oil 102 and the MMO catalyst 112 may be contacted in the first reactor 110 at a temperature of from 300° C. to 450° C., such as from 300° C. to 425° C. from 300° C. to 400° C., from 325° C. to 450° C., from 325° C. to 425° C., from 325° C. to 400° C., from 350° C. to 450° C., from 350° C. to 425° C., or from 350° C. to 400° C. The plastic derived oil 102 and the MMO catalyst 112 may be contacted in the first reactor 110 at a pressure of from 100 kPa to 1000 kPa, or at about atmospheric pressure (i.e., about 101.3 kPa).

The plastic derived oil 102 and the MMO catalyst 112 may be introduced to the first reactor 110 at a catalyst to oil weight ratio of greater than or equal to 0.2. The catalyst-to-oil weight ratio in the first reactor 110 is equal to a weight of the MMO catalyst 112 divided by a weight of the plastic derived oil 102 in the first reactor 110 averaged over time at steady state. In embodiments, catalyst-to-oil weight ratio in the first reactor 110 may be from 0.2 to 20, such as from 0.2 to 10, from 0.2 to 5, from 0.5 to 20, from 0.5 to 10, from 0.5 to 5, from 1 to 20, from 1 to 10, from 1 to 5, from 2 to 20, from 2 to 10, from 2 to 5, from 5 to 20, or from 5 to 10.

The catalyst-to-oil weight ratio in the first reactor 110 may be adjusted based on the concentration of halogen-containing compounds in the plastic derived oil 102. Specifically, the catalyst-to-oil weight ratio in the first reactor 110 can be increased when the concentration of halogen-containing compounds increases and decreased when the concentration of halogen-containing compounds decreases. In embodiments, the methods and processes disclosed herein may include adjusting the catalyst-to-oil weight ratio in the first reactor 110 based on the concentration of the halogen-containing compounds in the portion of the plastic derived oil 102 passed to the first reactor 110 (plastic derived oil 102 or treated plastic derived oil 192). In embodiments, adjusting the weight ratio of catalyst-to-oil in the first reactor 110 may include determining a concentration of the halogen-containing compounds in the plastic derived oil 102 and adjusting a flow rate of the plastic derived oil 102 to the first reactor 110, a flow rate of the MMO catalyst 112 to the first reactor 110, or both, to adjust the catalyst-to-oil weight ratio. The weight ratio of catalyst-to-oil may be adjusted in proportion to the concentration of halogen-containing compounds in the plastic derived oil 102. Referring to FIG. 2, the concentration of the halogen-containing compounds in the plastic derived oil 102 may be determined using a sensor 170 disposed in the plastic derived oil 102. The sensor 170 or a supplemental sensor (not shown) may be positioned to determine the concentration of halogen-containing compounds in the treated plastic derived oil 192. The sensor 170 may be positioned upstream or downstream of the point where the supplemental feed stream 106 is combined with the plastic derived oil 102.

Referring again to FIG. 2, at the outlet of the reaction zone of the first reactor 110, the first reactor effluent 114 may be separated from the used MMO catalyst 116. The first reactor effluent 114 and the used MMO catalyst 116 may be separated in the catalyst separation zone 306 (FIG. 3) of the first reactor 110. Referring to FIG. 2, the first reactor effluent 114 may be passed from the first reactor 110 directly to the adsorption unit 120. The used MMO catalyst 116 may be passed directly to the catalyst regenerator 160. The first reactor effluent 114 may be treated in the adsorption unit 120 and then separated in the first reactor effluent separation system 130 to produce the light effluent 132 and the heavy stream 134, as previously discussed herein. The heavy stream 134 may be passed to the second reactor 140.

Referring again to FIG. 2, the second reactor 140 may be a fluidized bed reactor operable to conduct fluidized catalytic cracking of the heavy stream 134 to produce the second reactor effluent 144 comprising light olefins, light aromatic compounds, or both. Fluidized catalytic cracking (FCC) is a conversion process used in petroleum refineries and is utilized to convert the high-boiling, high-molecular weight hydrocarbon fractions of petroleum crude oils or other hydrocarbon stream into more valuable gasoline, olefinic gases, and other products. The second reactor 140 may be a riser reactor or a downer reactor.

In embodiments, the second reactor 140 may be a riser reactor. The heavy stream 134 and the cracking catalyst 142 may be introduced to an inlet of the riser of the second reactor 140. The heavy stream 134 and the cracking catalyst 142 may be contacted in the riser reactor and may travel together through the riser and reaction zone of the second reactor 140. The cracking catalyst 142 may be any of the catalysts previously discussed in the present disclosure as being suitable for the cracking catalyst. In embodiments, the heavy stream 134 may be introduced to the second reactor 140 accompanied by steam or other suitable gas for atomization of the feed stream (not shown). The heavy stream 134 may be admixed and intimately contacted with an effective quantity of heated fresh or regenerated solid cracking catalyst particles.

The heavy stream 134 and the cracking catalyst 142 may be contacted in the second reactor 140 at a temperature of from 450° C. to 700° C., such as from 450° C. to 675° C., from 450° C. to 650° C., from 450° C. to 600° C., from 500° C. to 700° C., from 500° C. to 675° C., from 500° C. to 650° C., from 500° C. to 600° C., from 550° C. to 700° C., from 550° C. to 675° C., or from 550° C. to 650° C. The heavy stream 134 and the cracking catalyst 142 may be contacted in the second reactor 140 at a pressure of from 100 kPa to 2,000 kPa, such as from 100 kPa to 1,000 kPa, from 100 kPa to 300 kPa, from 200 kPa to 2000 kPa, from 200 kPa to 1000 kPa, from 200 kPa to 300 kPa, from 300 kPa to 2000 kPa, from 300 kPa to 1000 kPa, or at about atmospheric pressure (i.e., about 101.3 kPa). The heavy stream 134 and the cracking catalyst 142 may be contacted in the second reactor 140 for a contact time of from 0.1 seconds to 30 seconds, such as from 0.1 seconds to 20 seconds, from 0.1 seconds to 10 seconds, from 0.1 seconds to 5 seconds, from 1 second to 30 seconds, from 1 second to 20 seconds, from 1 second to 10 seconds from 1 second to 5 seconds, from 3 seconds to 30 seconds, from 3 seconds to 20 seconds, from 3 seconds to 10 seconds, from 5 seconds to 30 seconds, from 5 seconds to 20 seconds, or from 5 seconds to 10 seconds. The contact time may refer to the time that the reactants in the heavy stream 134 are in contact with the cracking catalyst 142 at the reaction temperature in the reaction zone before being separated in the separation zone downstream of the reaction zone.

A catalyst-to-oil weight ratio in the second reactor 140 may be from 3:1 to 20:1, such as from 3:1 to 10:1, from 3:1 to 8:1, from 4:1 to 20:1, from 4:1 to 10:1, from 4:1 to 8:1, from 6:1 to 20:1, from 6:1 to 10:1, from 6:1 to 8:1, or from 8:1 to 20:1. The catalyst-to-oil weight ratio in the second reactor 140 refers to the ratio of the mass flow rate of the cracking catalyst 142 to the mass flow rate of the heavy stream 134 passed to the second reactor 140. In embodiments, the second reactor 140 may be a downer reactor. When the second reactor 140 is a downer reactor, the catalyst-to-oil weight ratio in the second reactor 140 may be from 3:1 to about 60:1, such as from 3:1 to 50:1, from 3:1 to 40:1, from 4:1 to 60:1, from 4:1 to 50:1, from 4:1 to 40:1, from 6:1 to 60:1, from 6:1 to 50:1, or from 6:1 to 40:1.

Referring again to FIG. 2, at the outlet of the reaction zone of the second reactor 140, the second reactor effluent 144 may be separated from the used cracking catalyst 146. The second reactor effluent 144 and the used cracking catalyst 146 may be separated in the catalyst separation zone 306 (FIG. 3) of the second reactor 140. Referring to FIG. 2, the second reactor effluent 144 may be passed from the second reactor 140 directly to the product separation system 150. The used cracking catalyst 146 may be passed directly to the catalyst regenerator 160. The second reactor effluent 144 may be combined with the light effluent 132 upstream of the product separation system 150 or the light effluent 132 and second reactor effluent 144 may be passed separately to the product separation system 150 and combined in the product separation system 150. The light effluent 132 and the second reactor effluent 144 may be separated in the product separation system 150 as previously discussed in the present disclosure.

Referring again to FIG. 2, the used MMO catalyst 116 and the used cracking catalyst 146 may be passed to the catalyst regenerator 160, which may be a single common regenerator. The used MMO catalyst 116 and the used cracking catalyst 146 may be passed separately to the catalyst regenerator 160 and combined and mixed within the catalyst regenerator 160, or the used MMO catalyst 116 and the used cracking catalyst 146 may be combined upstream of the catalyst regenerator 160 to produce a mixed used catalyst stream, which is then passed to the catalyst regenerator 160. In the catalyst regenerator 160, the used MMO catalyst 116 and the used cracking catalyst 146 may be comingled in the catalyst regenerator 160 to produce a catalyst mixture.

The used MMO catalyst 116 and the used cracking catalyst 146 may be processed in the catalyst regenerator 160 to restore catalytic activity to the MMO catalyst and the cracking catalyst 146, such as by removing coke deposits from the catalyst particles, heating the catalyst particles, or both. The used catalyst particles (used MMO catalyst 116 and the used cracking catalyst 146) containing coke deposits from the reactions in the first reactor 110 or second reactor 140 can be passed to the regeneration zone of the catalyst regenerator 160. In the regeneration zone of the regenerator 320, the used catalyst mixture comprising the used MMO catalyst 116 and the used cracking catalyst 146 may come into contact with a stream of oxygen-containing gas (not shown), which may enter the regeneration zone of the catalyst regenerator 160. Contact with the oxygen-containing gas may cause the coke deposits to undergo oxidation (combustion), which may remove the coke deposits from and heat the catalyst particles of the used catalyst mixture to produce a regenerated catalyst mixture 162. The regenerated catalyst mixture 162 may include regenerated MMO catalyst and regenerated cracking catalyst, which are comingled together.

Referring again to FIG. 2, the regenerated catalyst mixture 162 may be passed the catalyst separator 164 disposed downstream of the catalyst regenerator 160. The catalyst separator 164 may be a gravity-based separation device that allows the two different types of catalyst to settle out according to density so that the denser catalyst particles settle at the bottom and the less dense catalyst particles settle at the top of the catalyst separator 164. Thus, the catalyst separator 164 may separate the regenerated catalyst mixture 162 based on density to produce the regenerated MMO catalyst 112 and the regenerated cracking catalyst 142. The regenerated MMO catalyst 112 may be passed to the first reactor 110, and the regenerated cracking catalyst 142 may be passed back to the second reactor 140.

Referring again to FIG. 2, in embodiments, the plastic derived oil 102 from the pyrolysis reactor 20 may have a concentration of inorganic contaminants, polar contaminants, halogen containing compounds, or combinations that is high enough to cause problems in the first reactor 110, the second reactor 140, or both, such as but not limited to deactivation of the MMO catalyst, rapid saturation of the adsorbent in the adsorption unit 120, or other the problems. Thus, in embodiments, the plastic derived oil 102 may be treated upstream of the first reactor 110 to reduce the concentration of contaminants in the plastic derived oil 102. In embodiments, the system 100 may include a water wash unit 180 and an upstream adsorption unit 190, which are both disposed upstream of the first reactor 110 and downstream of the pyrolysis reactor 20.

The wash water unit 180 may be disposed downstream of the pyrolysis reactor 20. All or a portion of the plastic derived oil 102 may be passed from the pyrolysis reactor 20 to the wash water unit 180, such as being passed directly from the pyrolysis reactor 20 to the wash water unit 180. The wash water unit 180 may include one or a plurality of units operable to contact the plastic derived oil 102 with wash water 182 and then separating the aqueous phase from the oil phase to produce a washed plastic derived oil 184 and used wash water 186. The methods disclosed herein may include washing the plastic derived oil 102 with the wash water 182 in the water wash unit 180 upstream of the first reactor 110. Washing the plastic derived oil 102 with the wash water 182 may remove inorganic and polar contaminants from the plastic derived oil to produce the washed plastic derived oil 184. The washed plastic derived oil 184 may have a concentration of inorganic contaminants, polar contaminants, halogen compounds, or combinations of these compared to the plastic derived oil 102. The used wash water 186 may be passed to one or more downstream unit operations to treat the used wash water 186. The washed plastic derived oil 184 may be passed out of the water wash unit 180.

The washed plastic derived oil 184 may be passed from the wash water unit 180 to the upstream adsorption unit 190, which may be disposed downstream of the wash water unit 180 and upstream of the first reactor 110. The upstream adsorption unit 190 comprises one or more adsorbent beds containing an adsorbent material. The adsorbent materials may be any of the adsorbents previously described for the adsorption unit 120 for removing organic halide compounds. The upstream adsorption unit 190 may be operable to contact the washed plastic derived oil 184 with the adsorbents, which may adsorb additional organic halide compounds, such as organochloride compounds or other contaminants, from the washed plastic derived oil 184 to produce a treated plastic derived oil 192. The methods disclosed herein may include contacting the washed plastic derived oil 184 with the adsorbents in the upstream adsorption unit 190, where contact with the adsorbent removes organic halide compounds and other contaminants from the washed plastic derived oil 184 to produce a treated plastic derived oil 192.

This steps of washing the plastic derived oil 102 with the wash water 182 and treating the washed plastic derived oil 184 in the upstream adsorption unit 190 may be employed depending on the concentration of halogens and other contaminants in the plastic derived oil 102. In embodiments, the water wash unit 180 and the upstream adsorption unit 190 may be utilized when the concentration of organic chlorides and other organic halide compounds in the plastic derived oil 102 exceeds 100 ppmw. Treating the washed plastic derived oil 184 in the upstream adsorption unit 190 may further reduce the concentration of the organic chlorides to reduce the burden on the MMO catalyst 112 in the first reactor 110. The wash water unit 180 and upstream adsorption unit 190 may also be used to increase the blending ratio of the treated plastic derived oil 192 with other supplemental feed streams 106 during co-processing.

Referring again to FIG. 2, in embodiments, the system 100 may include a control system 200 for determining whether to pass the plastic derived oil 102 directly to the first reactor 110 or to divert the plastic derived oil 102 to the wash water unit 180 and the upstream adsorption unit 190. The system 100 may further include a sensor 170, a first control valve 172, and a second control valve 174. The sensor 170 may be disposed in contact with the plastic derived oil 102 downstream of the pyrolysis reactor 20 and upstream of the first reactor 110. The sensor 170 may be operable to determine a concentration of organic halide compounds in the plastic derived oil 102. The first control valve 172 may be disposed in the line transferring the plastic derived oil 102 directly to the first reactor 110 and may be operable to control the flow of the plastic derived oil 102 directly to the first reactor 110. The second control valve 174 may be disposed in parallel with the first control valve 172 and upstream of the wash water unit 180, such as in the line transferring the plastic derived oil 102 to the wash water unit 180. The second control valve 174 may be operable to control the flow of the plastic derived oil 102 to the wash water unit 180. The sensor 170, first control valve 172, and second control valve 174 may each be communicatively coupled to the control system 200 through wired or wireless communication channels.

The control system 200 may include one or a plurality of processors 202, one or a plurality of memory modules 204 communicatively coupled to the processors 202, and computer readable and executable instructions stored in the memory modules 204. The control system 200 may be communicatively coupled to the sensor 170, the first control valve 172, the second control valve 174, or combinations of these. The control system 200 may be configured to control operation or actuation of the first control valve 172, the second control valve 174, or both based on information from the sensor 170 to send the plastic derived oil 102 directly to the first reactor 110 or to the water wash unit 180 and upstream adsorption unit 190 upstream of the first reactor 110. The processes and methods disclosed herein may be embodied in the computer readable and executable instructions 206 and practiced by executing the computer readable and executable instructions 206 by the one or more processors 202 of the control system 200.

Referring again to FIG. 2, the processes disclosed herein may include measuring concentrations of halogenated compounds, contaminants, or both in the plastic derived oil 102 upstream of the first reactor 110, and comparing the concentrations of the halogenated compounds, contaminants, or both in the plastic derived oil 102 to a threshold concentration. When the concentrations of halogenated compounds, contaminants, or both in the plastic derived oil 102 are below the threshold concentration, the processes may include passing the plastic derived oil 102 directly to the first reactor 110. When the concentrations of halogenated compounds, contaminants, or both in the plastic derived oil 102 are greater than or equal to the threshold concentration, the processes may include passing the plastic derived oil 102 to the water wash unit 180 and upstream adsorption unit 190 to produce a treated plastic derived oil 192 and then passing the treated plastic derived oil 192 to the first reactor 110. In embodiments, the threshold concentration of halogen containing compounds in the plastic derived oil 102 may be 100 ppmw (parts per million by weight).

Referring to FIG. 2, as previously discussed, the control system 200 may include the one or more processors 202 and one or more memory modules 204. The one or more processors 202 may include any device capable of executing computer-readable executable instructions stored on a non-transitory computer-readable medium. Accordingly, each processor 202 may include an integrated circuit, a microchip, a computer, and/or any other computing device. The one or more memory modules 204 are communicatively coupled to the one or more processors 202 over a communication path. The one or more memory modules 204 may be configured as volatile and/or nonvolatile memory and, as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. The one or more memory modules 204 may be configured to store machine readable and executable instructions 206 for operating one or more components of the system 100.

Embodiments of the present disclosure include logic stored on the one or more memory modules 204 that includes machine-readable and executable instructions or an algorithm written in any programming language of any generation (e.g., 1GL, 2GL, 3GL, 4GL, and/or 5GL) such as, machine language that may be directly executed by the one or more processors 202, assembly language, obstacle-oriented programming (OOP), scripting languages, microcode, etc., that may be compiled or assembled into machine readable instructions and stored on a machine readable medium. Similarly, the logic and/or algorithm may be written in a hardware description language (HDL), such as logic implemented via either a field-programmable gate array (FPGA) configuration or an application-specific integrated circuit (ASIC), and their equivalents. Accordingly, the logic may be implemented in any conventional computer programming language, as pre-programmed hardware elements, and/or as a combination of hardware and software components.

EXAMPLES

The various embodiments of systems and processes of the present disclosure will be further clarified by the following examples. The examples are illustrative in nature, and should not be understood to limit the subject matter of the present disclosure.

A plastic derived oil produced from solid waste plastic was catalytically cracked according to an Advanced Cracking Evaluation (ACE) test procedure to show the products produced through catalytically cracking a plastic derived oil. The ACE tests were conducted using a micro-activity cracking testing (MAT) unit. The MAT unit and ACE testing process is described more in detail in U.S. Pat. No. 6,069,012. The ACE testing was performed with a catalyst to oil weight ratio of 8, and the catalytic cracking was conducted at temperatures of 550° C., 575° C., 600° C. and 650° C.

For each experimental run, the reactor effluent was passed out of the MAT unit and sent to a gas/liquid separator, which separated the reactor effluent into a liquid product stream and a gaseous product stream. The gaseous product stream was analyzed by an online gas chromatography system (Agilent 7890 gas chromatograph) equipped with both FID and TCD detectors. The liquid product stream was analyzed according to the offline analytical test methods. In particular, the liquid product stream was analyzed by simulated distillation according to test method EN 15199-2 using the Agilent 7890 gas chromatograph. For the simulated distillation, the analysis was conducted for four distillation fractions: (1) light hydrocarbon gases having 1-4 carbon atoms; (2) a naphtha fraction having a boiling point range of from C5 (boiling point temperature >25° C.) to 221° C.; (3) a middle distillate fraction having a boiling point range of from 221° C. to 343° C.; and (4) a heavy distillate fraction having boiling point temperatures greater than 343° C. The light hydrocarbon gases were further classified into fuel gas (hydrogen and methane), C2-C4 paraffins, ethylene, propylene, and butenes. Coke is quantified after passing an air stream through the MAT unit at high temperatures to burn the coke into a mixture of carbon monoxide, carbon dioxide, and water, and then passing the combustion gases through a calibrated infrared analyzer. The composition of the plastic derived oil and the reaction products are provided in Table 2 and in FIG. 4.

TABLE 2

| Constituent | Plastic derived oil | 1 | 2 | 3 | 4 |
|---|---|---|---|---|---|
| Rxn Temperature (° C.) | N/A | 550 | 575 | 600 | 650 |
| Fuel Gas (wt. %) | — | 1.8 | 2.0 | 3.7 | 5.9 |
| C2-C4 paraffin (wt. %) | — | 22.8 | 17.0 | 17.5 | 12.2 |
| Ethylene (wt. %) | — | 6.1 | 6.5 | 9.8 | 15.1 |
| Propylene (wt. %) | — | 9.6 | 10.0 | 12.1 | 16.7 |
| Butenes (wt. %) | — | 8.5 | 8.5 | 7.8 | 8.3 |
| Naphtha (wt. %) | 38.1 | 35.1 | 43.2 | 45.0 | 37.6 |
| Middle Distillate (wt. %) | 47.9 | 10.7 | 8.38 | <1 | <1 |
| Heavy Distillate (wt. %) | 14.1 | 2.6 | 1.9 | <1 | <1 |
| Coke (wt. %) | — | 2.8 | 2.6 | 2.8 | 3.3 |

Figure 4:
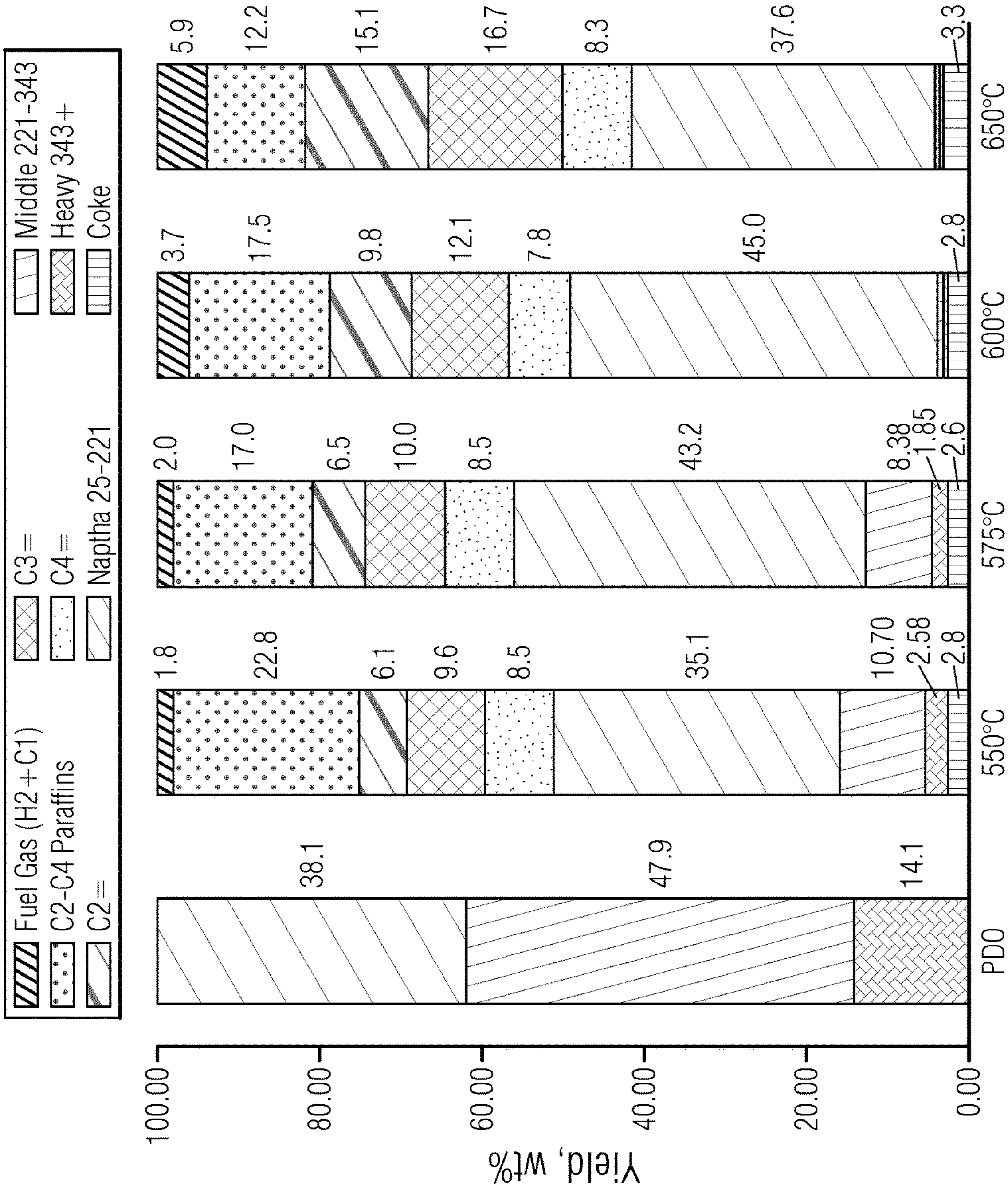
FIG. 4 graphically depicts the composition of the plastic derived oil and reaction effluents from fluidized catalytically cracking the plastic derived oil at various cracking temperatures, according to embodiments shown and described in this disclosure.
Figure 5:
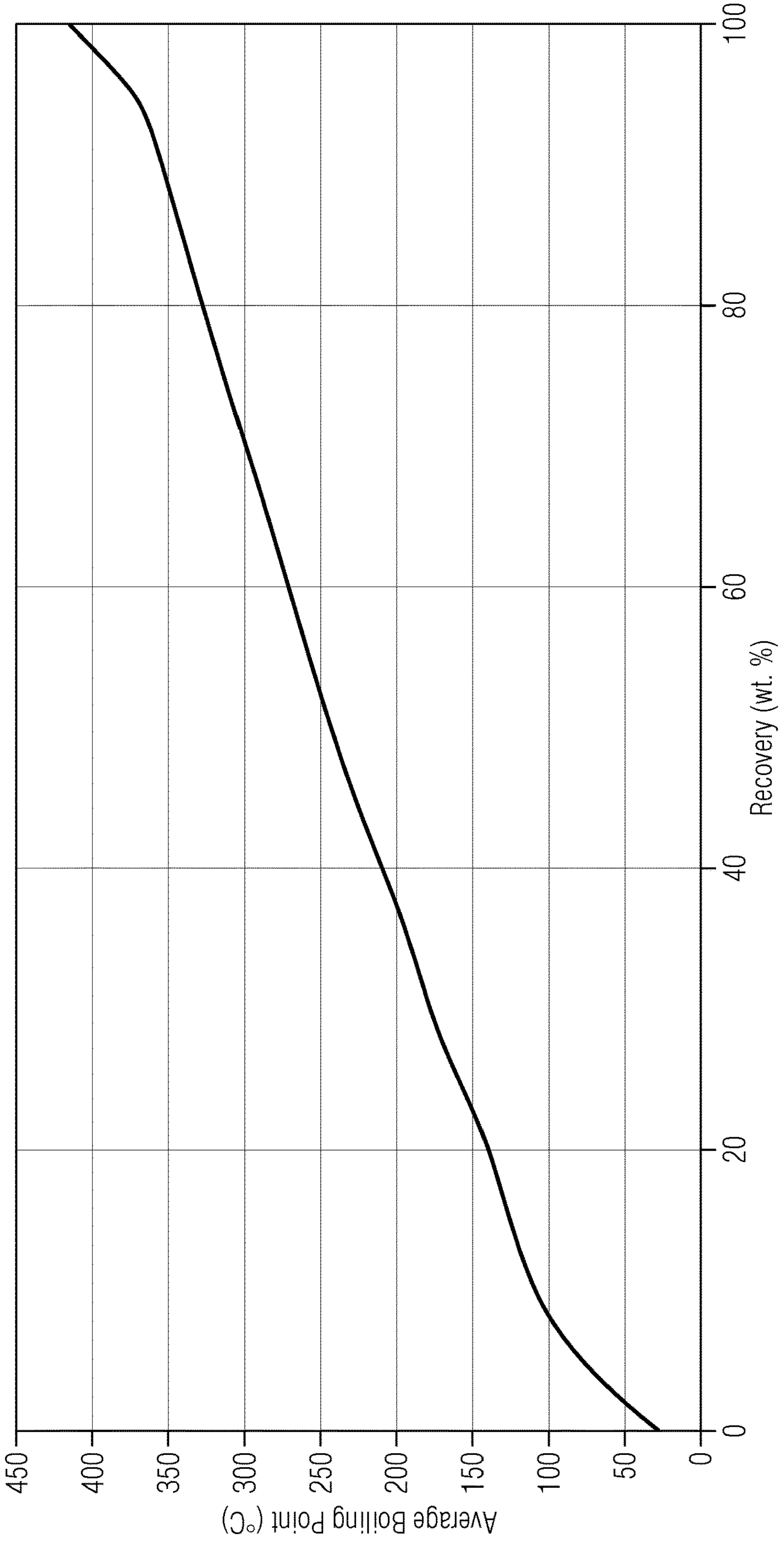
FIG. 5 graphically depicts boiling point temperature (y-axis) as a function of percentage recovery (x-axis) for simulated distillation of one embodiment of a plastic derived oil, according to embodiments shown and described in this disclosure.

Referring to FIG. 4 and Table 2, the plastic derived oil is a suitable feed for fluidized catalytic cracking, where the plastic derived oil can be converted to generate circular chemicals such as ethylene, propylene, and butenes, as well as low carbon footprint fuels (naphtha). The reactor set up in this disclosure, allows for the continuous decontamination and the catalytic cracking of plastic derived oil to generate circular chemicals and a halogen free low carbon footprint fuel.

A first aspect of the present disclosure is directed to a process for upgrading a plastic derived oil, where the process may comprise providing the plastic derived oil comprising hydrocarbons and greater than or equal to 100 parts per million by weight (ppmw) halogen-containing compounds based on the total weight of the plastic derived oil. The process may further include contacting the plastic derived oil with a mixed metal oxide catalyst (MMO catalyst) in a first reactor at reaction conditions, where contacting the plastic derived oil with the MMO catalyst at reaction conditions may remove halogens from the plastic derived oil to produce a first reactor effluent comprising less than 100 ppmw halogen-containing compounds based on the total weight of the first reactor effluent. The process may further include contacting the first reactor effluent with an adsorbent in an adsorption unit disposed downstream of the first reactor to produce a treated first reactor effluent, passing at least a portion of the treated first reactor effluent to a second reactor disposed downstream of the first reactor, and contacting at least a portion of the treated first reactor effluent with a cracking catalyst in the second reactor. The cracking catalyst is different from the mixed metal oxide catalyst, and the contacting with the cracking catalyst may cause hydrocarbons in the at least a portion of the treated first reactor effluent to undergo catalytic cracking to produce a second reactor effluent comprising light olefins, naphtha range hydrocarbons, or combinations thereof.

A second aspect of the present disclosure may include the first aspect, wherein the first reactor and the second reactor may be fluidized bed reactors and the process may further comprise separating the first reactor effluent from a used MMO catalyst at an outlet end of the first reactor, and separating the second reactor effluent from a used cracking catalyst at an outlet end of the second reactor.

A third aspect of the present disclosure may include the second aspect, further comprising passing the used MMO catalyst and the used cracking catalyst to a single regenerator, where the used MMO catalyst and the used cracking catalyst may be mixed together in the single regenerator to produce a used catalyst mixture. The process may further include regenerating the used catalyst mixture in the single regenerator to produce a regenerated catalyst mixture, and separating the regenerated catalyst mixture in a catalyst separator to produce a regenerated MMO catalyst and a regenerated cracking catalyst.

A fourth aspect of the present disclosure may include the third aspect, further comprising passing the regenerated MMO catalyst back to the first reactor, and passing the regenerated FCC catalyst back to the second reactor.

A fifth aspect of the present disclosure may include either one of the third or fourth aspects, wherein the catalyst separator may separate the regenerated catalyst mixture based on density to produce the regenerated MMO catalyst and the regenerated cracking catalyst.

A sixth aspect of the present disclosure may include any one of the first through fifth aspects, where the first reactor may be a fluidized bed reactor comprising a riser reactor or a downer reactor.

A seventh aspect of the present disclosure may include the sixth aspect, where the first reactor may be a riser reactor.

An eighth aspect of the present disclosure may include either one of the sixth or seventh aspects, further comprising separating the first reactor effluent from a used MMO catalyst in a catalyst separation zone disposed at an outlet end of the first reactor.

A ninth aspect of the present disclosure may include any one of the first through eighth aspects, where contact of the plastic derived oil with the MMO catalyst at reaction conditions may cause reaction of halogen-containing organic compounds to produce hydrogen halides and hydrocarbons and adsorption of the hydrogen halides onto the MMO catalyst.

A tenth aspect of the present disclosure may include any one of the first through ninth aspects, where the MMO catalyst may comprise a plurality of metal oxides, where each of the metal oxides are randomly distributed throughout the MMO catalyst.

An eleventh aspect of the present disclosure may include any one of the first through tenth aspects, where the MMO catalyst may comprise a plurality of the metal oxides selected from the group consisting of $Fe_2O_3$, $ZrO_2$, $CeO_2$, $Al_2O_3$, $TiO_2$, CaO, $SiO_2$, $Na_2O$, MgO, and combinations thereof.

A twelfth aspect of the present disclosure may include any one of the first through eleventh aspects, where the MMO catalyst may comprise MMO particles, wherein the MMO particles may comprise one or more of the following: red mud comprising from 5 wt. % to 60 wt. % $Fe_2O_3$, from 5 wt. % to 30 wt. % $Al_2O_3$, from 0 wt. % to 15 wt. % $TiO_2$, from 2 wt. % to 14 wt. % CaO, from 3 wt. % to 50 wt. % $SiO_2$, and from 1 wt. % to 10 wt. % $Na_2O$ based on the total weight of the red mud; cement raw meal comprising from 1 wt. % to 18 wt. % $Fe_2O_3$, from 40 wt. % to 50 wt. % $Al_2O_3$, from 35 wt. % to 40 wt. % CaO, and from 5 wt. % to 10 wt. % $SiO_2$ based on the total weight of the cement raw meal; cement slag comprising from 8 wt. % to 24 wt. % $Al_2O_3$, from 30 wt. % to 50 wt. % CaO, from 28 wt. % to 38 wt. % $SiO_2$, and from 1 wt. % to 18 wt. % MgO based on the total weight of the cement slag; a co-precipitated MMO catalyst particles comprising from 60 wt. % to 95 wt. % $Fe_2O_3$, from 1 wt. % to 20 wt. % $ZrO_2$, from 0.1 wt. % to 10 wt. % $CeO_2$, and from 1 wt. % to 20 wt. % $Al_2O_3$ based on the total weight of the co-precipitated MMO catalyst; or combinations thereof.

A thirteenth aspect of the present disclosure may include the twelfth aspect, where the MMO particles may be the co-precipitated MMO catalyst particles comprising from 60 wt. % to 95 wt. % $Fe_2O_3$, from 1 wt. % to 20 wt. % $ZrO_2$, from 0.1 wt. % to 10 wt. % $CeO_2$, and from 1 wt. % to 20 wt. % $Al_2O_3$, where the weight percentages are based on the total weight of the MMO particles.

A fourteenth aspect of the present disclosure may include the thirteenth aspect, where the MMO particles may comprise 83 wt. % $Fe_2O_3$, 7.5 wt. % $ZrO_2$, 2.5 wt. % $CeO_2$, and 7.0 wt. % $Al_2O_3$ based on the total weight of the MMO particles.

A fifteenth aspect of the present disclosure may include any one of the tenth through fourteenth aspects, where the MMO catalyst further may comprise a binder.

A sixteenth aspect of the present disclosure may include any one of the first through fifteenth aspects, comprising contacting the plastic derived oil with the MMO catalyst at a temperature of from 300° C. to 450° C., at a pressure of from 100 kPa to 300 kPa, and at a catalyst to oil weight ratio of greater than or equal to 0.2, wherein the catalyst-to-oil weight ratio in the first reactor is equal to an average ratio of a weight of the MMO catalyst divided by a weight of the plastic derived oil in the first reactor averaged over time at steady state.

A seventeenth aspect of the present disclosure may include any one of the first through sixteenth aspects, comprising adjusting the catalyst-to-oil weight ratio in the first reactor based on a concentration of the halogen-containing compounds in the plastic derived oil.

An eighteenth aspect of the present disclosure may include the seventeenth aspect, where adjusting the catalyst-to-oil weight ratio in the first reactor may comprise determining a concentration of the halogen-containing compounds in the plastic derived oil and adjusting a flow rate of the plastic derived oil to the first reactor, a flow rate of the MMO catalyst to the first reactor, or both, where the catalyst-to-oil weight ratio may be adjusted in proportion to the concentration of the halogen-containing compounds in the plastic derived oil.

A nineteenth aspect of the present disclosure may include any one of the first through eighteenth aspects, comprising passing a supplemental feed stream to the first reactor or combining the supplemental feed stream with the plastic derived oil upstream of the first reactor.

A twentieth aspect of the present disclosure may include any one of the first through nineteenth aspects, comprising contacting the at least a portion of the treated first reactor effluent with the cracking catalyst at a temperature of from 500° C. to 650° C., at a pressure of 100 kPa to 300 kPa, and at a catalyst to oil weight ratio of greater than or equal to 2, where the catalyst to oil weight ratio in the second reactor is equal to an average ratio of a weight of the cracking catalyst divided by a weight of the at least a portion of the treated first reactor effluent in the second reactor averaged over time during steady state operation of the second reactor.

A twenty-first aspect of the present disclosure may include any one of the first through twentieth aspects, further comprising separating the second reactor effluent in a product separation system to produce a plurality of product streams.

A twenty-second aspect of the present disclosure may include the twenty-first aspect, where the plurality of product streams may comprise an ethylene stream, a propylene stream, a mixed butenes stream, a BTX stream, a gasoline stream, or combinations thereof.

A twenty-third aspect of the present disclosure may include any one of the first through twenty-second aspects, further comprising separating the treated first reactor effluent in a first reactor effluent separation system to produce a light effluent and a heavy stream and passing the heavy stream to the second reactor as the at least a portion of the treated first reactor effluent, where the first reactor effluent separation system may be upstream of the second reactor and downstream of the adsorption unit.

A twenty-fourth aspect of the present disclosure may include the twenty-third aspect, comprising passing the light effluent to the product separation system or combining the light effluent with the second reactor effluent upstream of the product separation system and separating the light effluent and the second reactor effluent in the product separation system to produce the plurality of product streams.

A twenty-fifth aspect of the present disclosure may include any one of the first through twenty-fourth aspects, further comprising washing the plastic derived oil with water in a water wash unit upstream of the first reactor, where the washing the plastic derived oil with water may remove inorganic contaminants, polar contaminants, or both from the plastic derived oil to produce a washed plastic derived oil. The process may further include contacting the washed plastic derived oil with an adsorbent in an upstream adsorption unit disposed downstream of the water wash unit and upstream of the first reactor, where contact with the adsorbent may remove organic halide compounds and other contaminants from the washed plastic derived oil to produce a treated plastic derived oil. The process may further include passing the treated plastic derived oil to the first reactor.

A twenty-sixth aspect of the present disclosure may include the twenty-fifth aspect, further comprising measuring a concentration of the halogen-containing compounds in the plastic derived oil upstream of the first reactor; comparing the concentrations of the halogen-containing compounds, contaminants, or both to a threshold concentration; when the concentration of the halogen-containing compounds is less than the threshold concentration, passing the plastic derived oil directly to the first reactor; and when the concentration of the halogen-containing compounds is greater than or equal to the threshold concentration, passing the plastic derived oil to the water wash unit and then to the upstream adsorption unit.

A twenty-seventh aspect of the present disclosure may include any one of the first through twenty-sixth aspects, further comprising producing the plastic derived oil from solid waste plastic.

A twenty-eighth aspect of the present disclosure may include the twenty-seventh aspect, wherein producing the plastic derived oil may comprise liquefying the solid plastic waste in a dehalogenation reactor to produce a liquefied plastic stream having a concentration of halogen compounds less than the solid plastic waste, passing the liquefied plastic stream to pyrolysis reactor downstream of the dehalogenation reactor, and subjecting the liquefied plastic stream to pyrolysis to produce the plastic derived oil.

A twenty-ninth aspect of the present disclosure may be directed to a system for upgrading a plastic derived oil. The system may comprise a plastic derived oil stream comprising the plastic derived oil, a first reactor comprising a mixed metal oxide (MMO) catalyst, an adsorption unit disposed downstream of the first reactor, and a second reactor disposed downstream of the first reactor and the adsorption unit. The MMO catalyst may comprise a plurality of metal oxides, where each of the metal oxides may be randomly distributed throughout the MMO catalyst. The first reactor may be configured to receive at least a portion of the plastic derived oil stream and to contact the portion of the plastic derived oil stream with the MMO catalyst at reaction conditions sufficient to remove halogen-containing compounds and other contaminants from the plastic derived oil to produce a first reactor effluent. The adsorption unit may be configured to contact the first reactor effluent with an adsorbent to remove additional halogen-containing compounds from the first reactor effluent to produce a treated first reactor effluent. The second reactor may comprise a cracking catalyst. The second reactor may be configured to contact at least a portion of the treated first reactor effluent with the cracking catalyst at reaction conditions sufficient to cause hydrocarbons in the at least a portion of the treated first reaction effluent to undergo catalytic cracking to produce a second reactor effluent comprising light olefins, naphtha range hydrocarbons, middle distillates, or combinations thereof.

A thirtieth aspect of the present disclosure may include the twenty-ninth aspect, where the plastic derived oil stream may have a concentration of halogen-containing compounds of greater than or equal to 100 ppmw based on the total weight of the plastic derived oil stream.

A thirty-first aspect of the present disclosure may include either one of the twenty-ninth or thirtieth aspects, where the first reactor and the second reactor may be fluidized bed reactors.

A thirty-second aspect of the present disclosure may include the thirty-first aspect, further comprising a catalyst regenerator fluidly coupled to the first reactor and the second reactor to pass used MMO catalyst and used cracking catalyst from the first reactor and the second reactor, respectively, to the catalyst regenerator. The catalyst regenerator may be configured to treat a mixture of the used MMO catalyst and the used cracking catalyst in a common regeneration zone to produce a regenerated catalyst mixture comprising a mixture of regenerated MMO catalyst and regenerated cracking catalyst.

A thirty-third aspect of the present disclosure may include the thirty-second aspect, further comprising a catalyst separator configured to separate the regenerated catalyst mixture by density to produce a regenerated MMO catalyst and a regenerated cracking catalyst.

A thirty-fourth aspect of the present disclosure may include the thirty-third aspect, where the catalyst separator is fluidly coupled to the first reactor to pass the regenerated MMO catalyst back to the first reactor, and the catalyst separator is fluidly coupled to the second reactor to pass the regenerated cracking catalyst back to the second reactor.

A thirty-fifth aspect of the present disclosure may include any one of the twenty-ninth through thirty-fourth aspects, where the MMO catalyst may comprise a plurality of the metal oxides selected from the group consisting of $Fe_2O_3$, $ZrO_2$, $CeO_2$, $Al_2O_3$, $TiO_2$, CaO, $SiO_2$, $Na_2O$, MgO, and combinations thereof.

A thirty-sixth aspect of the present disclosure may include any one of the twenty-ninth through thirty-fifth aspects, where the MMO catalyst may comprise MMO particles, where the MMO particles may comprise one or more of the following: red mud comprising from 5 wt. % to 60 wt. % $Fe_2O_3$, from 5 wt. % to 30 wt. % $Al_2O_3$, from 0 wt. % to 15 wt. % $TiO_2$, from 2 wt. % to 14 wt. % CaO, from 3 wt. % to 50 wt. % $SiO_2$, and from 1 wt. % to 10 wt. % $Na_2O$ based on the total weight of the red mud; cement raw meal comprising from 1 wt. % to 18 wt. % $Fe_2O_3$, from 40 wt. % to 50 wt. % $Al_2O_3$, from 35 wt. % to 40 wt. % CaO, and from 5 wt. % to 10 wt. % $SiO_2$ based on the total weight of the cement raw meal; cement slag comprising from 8 wt. % to 24 wt. % $Al_2O_3$, from 30 wt. % to 50 wt. % CaO, from 28 wt. % to 38 wt. % $SiO_2$, and from 1 wt. % to 18 wt. % MgO based on the total weight of the cement slag; a co-precipitated MMO catalyst particles comprising from 60 wt. % to 95 wt. % $Fe_2O_3$, from 1 wt. % to 20 wt. % $ZrO_2$, from 0.1 wt. % to 10 wt. % $CeO_2$, and from 1 wt. % to 20 wt. % $Al_2O_3$ based on the total weight of the co-precipitated MMO catalyst; or combinations thereof.

A thirty-seventh aspect of the present disclosure may include the thirty-sixth aspect, where the MMO particles may be the co-precipitated MMO catalyst particles comprising from 60 wt. % to 95 wt. % $Fe_2O_3$, from 1 wt. % to 20 wt. % $ZrO_2$, from 0.1 wt. % to 10 wt. % $CeO_2$, and from 1 wt. % to 20 wt. % $Al_2O_3$, where the weight percentages are based on the total weight of the MMO particles.

A thirty-eighth aspect of the present disclosure may include the thirty-seventh aspect, where the MMO particles may comprise 83 wt. % $Fe_2O_3$, 7.5 wt. % $ZrO_2$, 2.5 wt. % $CeO_2$, and 7.0 wt. % $Al_2O_3$ based on the total weight of the MMO particles.

A thirty-ninth aspect of the present disclosure may include any one of the twenty-ninth through thirty-eighth aspects, further comprising: a water wash unit disposed upstream of the first reactor, where the water wash unit may be configured to contact the plastic derived oil stream with water to remove inorganic contaminants, polar contaminants, or both from the plastic derived oil to produce a washed plastic derived oil; and an upstream adsorption unit disposed between the water wash unit and the first reactor, where the upstream adsorption unit may be configured to contact the washed plastic derived oil with an adsorbent to remove at least a portion of the halogen-containing compounds from the washed plastic derived oil to produce a treated plastic derived oil.

A fortieth aspect of the present disclosure may include the thirty-ninth aspect, further comprising: a sensor disposed in the plastic derived oil stream and configured to measure a concentration of the halogen-containing compounds in the plastic derived oil; a first control valve disposed upstream of the first reactor and configured to control a flow of the plastic derived oil stream to the first reactor; a second control valve disposed upstream of the water wash unit and configured to control a flow of the plastic derived oil stream to the water wash unit; and a control system communicatively coupled to the sensor, the first control valve, and the second control valve, the control system comprising one or more processors, one or more memory modules, and computer readable and executable instructions stored on the one or more memory modules.

A forty-first aspect of the present disclosure may include the fortieth aspect, where the machine readable and executable instructions, when executed by the one or more processors, may cause the system to automatically: measure a concentration of the halogen-containing compounds in the plastic derived oil steam with the sensor; compare the concentrations of the halogen-containing compounds to a threshold concentration; when the concentration of the halogen-containing compounds is less than the threshold concentration, pass the plastic derived oil stream directly to the first reactor; and when the concentration of the halogen-containing compounds is greater than or equal to the threshold concentration, pass the plastic derived oil to the water wash unit and then to the upstream adsorption unit.

A forty-second aspect of the present disclosure may include any one of the twenty-ninth through forty-first aspects, further comprising: a pyrolysis reactor upstream of the first reactor, where the pyrolysis reactor may be configured to subject a liquefied plastic stream to pyrolysis to produce the plastic derived oil stream; and a dehalogenation reactor upstream of the pyrolysis reactor, the dehalogenation reaction may be configured to melt solid plastic waste to produce the liquefied plastic stream.

A forty-third aspect of the present disclosure may include any one of the twenty-ninth through forty-first aspects, further comprising a product separation system disposed downstream of the second reactor, the product separation system configured to separate the second reactor effluent to produce a plurality of product streams.

It is noted that any two quantitative values assigned to a property may constitute a range of that property, and all combinations of ranges formed from all stated quantitative values of a given property are contemplated in this disclosure.

It is noted that one or more of the following claims utilize the term "where" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

Having described the subject matter of the present disclosure in detail and by reference to specific aspects, it is noted that the various details of such aspects should not be taken to imply that these details are essential components of the aspects. Rather, the claims appended hereto should be taken as the sole representation of the breadth of the present disclosure and the corresponding scope of the various aspects described in this disclosure. Further, it will be apparent that modifications and variations are possible without departing from the scope of the appended claims.

What is claimed is:

1. A process for upgrading plastic derived oil, the process comprising:

providing a plastic derived oil comprising hydrocarbons and greater than or equal to 100 parts per million by weight (ppmw) halogen-containing compounds based on the total weight of the plastic derived oil;

contacting the plastic derived oil with a mixed metal oxide catalyst (MMO catalyst) in a first reactor at reaction conditions, where contacting the plastic derived oil with the MMO catalyst at reaction conditions removes halogens from the plastic derived oil to produce a first reactor effluent comprising less than 100 ppmw halogen-containing compounds based on the total weight of the first reactor effluent;

contacting the first reactor effluent with an adsorbent in an adsorption unit disposed downstream of the first reactor to produce a treated first reactor effluent;

passing at least a portion of the treated first reactor effluent to a second reactor disposed downstream of the first reactor;

contacting at least a portion of the treated first reactor effluent with a cracking catalyst in the second reactor, where:

the cracking catalyst is different from the MMO catalyst;

the contacting with the cracking catalyst causes hydrocarbons in the at least a portion of the treated first reactor effluent to undergo catalytic cracking to produce a second reactor effluent comprising light olefins, naphtha range hydrocarbons, or combinations thereof; and the MMO catalyst comprises MMO particles, wherein the MMO particles comprise one or more of the following: red mud comprising from 5 wt. % to 60 wt. % $Fe_2O_3$, from 5 wt. % to 30 wt. % $Al_2O_3$, from 0 wt. % to 15 wt. % $TiO_2$, from 2 wt. % to 14 wt. % CaO, from 3 wt. % to 50 wt. % $SiO_2$, and from 1 wt. % to 10 wt. % $Na_2O$ based on the total weight of the red mud; cement raw meal comprising from 1 wt. % to 18 wt. % $Fe_2O_3$, from 40 wt. % to 50 wt. % $Al_2O_3$, from 35 wt. % to 40 wt. % CaO, and from 5 wt. % to 10 wt. % $SiO_2$ based on the total weight of the cement raw meal; cement slag comprising from 8 wt. % to 24 wt. % $Al_2O_3$, from 30 wt. % to 50 wt. % CaO, from 28 wt. % to 38 wt. % $SiO_2$, and from 1 wt. % to 18 wt. % MgO based on the total weight of the cement slag; a co-precipitated MMO catalyst particles comprising from 60 wt. % to 95 wt. % $Fe_2O_3$, from 1 wt. % to 20 wt. % $ZrO_2$, from 0.1 wt. % to 10 wt. % $CeO_2$, and from 1 wt. % to 20 wt. % $Al_2O_3$ based on the total weight of the co-precipitated MMO catalyst; or combinations thereof.

2. The process of claim 1, wherein the first reactor and the second reactor are fluidized bed reactors and the process further comprises:

separating the first reactor effluent from a used MMO catalyst at an outlet end of the first reactor; and separating the second reactor effluent from a used cracking catalyst at an outlet end of the second reactor.

3. The process of claim 2, further comprising:

passing the used MMO catalyst and the used cracking catalyst to a single regenerator, where the used MMO catalyst and the used cracking catalyst are mixed together in the single regenerator to produce a used catalyst mixture;

regenerating the used catalyst mixture in the single regenerator to produce a regenerated catalyst mixture; and separating the regenerated catalyst mixture in a catalyst separator to produce a regenerated MMO catalyst and a regenerated cracking catalyst; and passing the regenerated MMO catalyst back to the first reactor, and passing the regenerated FCC catalyst back to the second reactor.

4. The process of claim 3, wherein the catalyst separator separates the regenerated catalyst mixture based on density to produce the regenerated MMO catalyst and the regenerated cracking catalyst.

5. The process of claim 1, where the first reactor is a fluidized bed reactor comprising a riser reactor or a downer reactor.

6. The process of claim 1, where the MMO catalyst comprises a plurality of metal oxides, where each of the metal oxides are randomly distributed throughout the MMO catalyst.

7. The process of claim 1, comprising contacting the plastic derived oil with the MMO catalyst at a temperature of from 300° C. to 450° C., at a pressure of from 100 kPa to 300 kPa, and at a catalyst to oil weight ratio of greater than or equal to 0.2, wherein the catalyst-to-oil weight ratio in the first reactor is equal to an average ratio of a weight of the MMO catalyst divided by a weight of the plastic derived oil in the first reactor averaged over time at steady state.

8. The process of claim 7, comprising adjusting the catalyst-to-oil weight ratio in the first reactor based on a concentration of the halogen-containing compounds in the plastic derived oil.

9. The process of claim 8, where adjusting the catalyst-to-oil weight ratio in the first reactor comprises:

determining a concentration of the halogen-containing compounds in the plastic derived oil; and adjusting a flow rate of the plastic derived oil to the first reactor, a flow rate of the MMO catalyst to the first reactor, or both, where the catalyst-to-oil weight ratio is adjusted in proportion to the concentration of the halogen-containing compounds in the plastic derived oil.

10. The process of claim 1, comprising passing a supplemental feed stream to the first reactor or combining the supplemental feed stream with the plastic derived oil upstream of the first reactor.

11. The process of claim 1, comprising contacting the at least a portion of the treated first reactor effluent with the cracking catalyst at a temperature of from 500° C. to 650° C., at a pressure of 100 kPa to 300 kPa, and at a catalyst to oil weight ratio of greater than or equal to 2, where the catalyst to oil weight ratio in the second reactor is equal to an average ratio of a weight of the cracking catalyst divided by a weight of the at least a portion of the treated first reactor effluent in the second reactor averaged over time during steady state operation of the second reactor.

12. The process of claim 1, further comprising separating the treated first reactor effluent in a first reactor effluent separation system to produce a light effluent and a heavy stream and passing the heavy stream to the second reactor as the at least a portion of the treated first reactor effluent, where the first reactor effluent separation system is upstream of the second reactor and downstream of the adsorption unit.

13. The process of claim 1, further comprising:

washing the plastic derived oil with water in a water wash unit upstream of the first reactor, where the washing the plastic derived oil with water removes inorganic contaminants, polar contaminants, or both from the plastic derived oil to produce a washed plastic derived oil;

contacting the washed plastic derived oil with an adsorbent in an upstream adsorption unit disposed downstream of the water wash unit and upstream of the first reactor, where contact with the adsorbent removes organic halide compounds and other contaminants from the washed plastic derived oil to produce a treated plastic derived oil; and passing the treated plastic derived oil to the first reactor.

14. The process of claim 13, further comprising:

measuring a concentration of the halogen-containing compounds in the plastic derived oil upstream of the first reactor;

comparing the concentrations of the halogen-containing compounds, contaminants, or both to a threshold concentration;

when the concentration of the halogen-containing compounds is less than the threshold concentration, passing the plastic derived oil directly to the first reactor; and when the concentration of the halogen-containing compounds is greater than or equal to the threshold concentration, passing the plastic derived oil to the water wash unit and then to the upstream adsorption unit.

15. A system for upgrading a plastic derived oil, the system comprising:

a plastic derived oil stream comprising the plastic derived oil;

a first reactor comprising a mixed metal oxide (MMO) catalyst, where:

the MMO catalyst comprises a plurality of metal oxides, where each of the metal oxides are randomly distributed throughout the MMO catalyst;

the MMO catalyst comprises MMO particles, wherein the MMO particles comprise one or more of the following: red mud comprising from 5 wt. % to 60 wt. % $Fe_2O_3$, from 5 wt. % to 30 wt. % $Al_2O_3$, from 0 wt. % to 15 wt. % $TiO_2$, from 2 wt. % to 14 wt. % CaO, from 3 wt. % to 50 wt. % $SiO_2$, and from 1 wt. % to 10 wt. % $Na_2O$ based on the total weight of the red mud; cement raw meal comprising from 1 wt. % to 18 wt. % $Fe_2O_3$, from 40 wt. % to 50 wt. % $Al_2O_3$, from 35 wt. % to 40 wt. % CaO, and from 5 wt. % to 10 wt. % $SiO_2$ based on the total weight of the cement raw meal; cement slag comprising from 8 wt. % to 24 wt. % $Al_2O_3$, from 30 wt. % to 50 wt. % CaO, from 28 wt. % to 38 wt. % $SiO_2$, and from 1 wt. % to 18 wt. % MgO based on the total weight of the cement slag; a co-precipitated MMO catalyst particles comprising from 60 wt. % to 95 wt. % $Fe_2O_3$, from 1 wt. % to 20 wt. % $ZrO_2$, from 0.1 wt. % to 10 wt. % $CeO_2$, and from 1 wt. % to 20 wt. % $Al_2O_3$ based on the total weight of the co-precipitated MMO catalyst; or combinations thereof; and the first reactor is configured to receive at least a portion of the plastic derived oil stream and to contact the portion of the plastic derived oil stream with the MMO catalyst at reaction conditions sufficient to remove halogen-containing compounds and other contaminants from the plastic derived oil to produce a first reactor effluent;

an adsorption unit disposed downstream of the first reactor, where the adsorption unit is configured to contact the first reactor effluent with an adsorbent to remove additional halogen-containing compounds from the first reactor effluent to produce a treated first reactor effluent; and a second reactor disposed downstream of the first reactor and the adsorption unit, where:

the second reactor comprises a cracking catalyst; and the second reactor is configured to contact at least a portion of the treated first reactor effluent with the cracking catalyst at reaction conditions sufficient to cause hydrocarbons in the at least a portion of the treated first reaction effluent to undergo catalytic cracking to produce a second reactor effluent comprising light olefins, naphtha range hydrocarbons, middle distillates, or combinations thereof.

16. The system of claim 15, where the first reactor and the second reactor are fluidized bed reactors and the system further comprises a catalyst regenerator fluidly coupled to the first reactor and the second reactor to pass used MMO catalyst and used cracking catalyst from the first reactor and the second reactor, respectively, to the catalyst regenerator, where the catalyst regenerator is configured to treat a mixture of the used MMO catalyst and the used cracking catalyst in a common regeneration zone to produce a regenerated catalyst mixture comprising a mixture of regenerated MMO catalyst and regenerated cracking catalyst.

17. The system of claim 16, further comprising a catalyst separator configured to separate the regenerated catalyst mixture by density to produce a regenerated MMO catalyst and a regenerated cracking catalyst.

18. The system of claim 15, further comprising:

a water wash unit disposed upstream of the first reactor, where the water wash unit is configured to contact the plastic derived oil stream with water to remove inorganic contaminants, polar contaminants, or both from the plastic derived oil to produce a washed plastic derived oil; and an upstream adsorption unit disposed between the water wash unit and the first reactor, where the upstream adsorption unit is configured to contact the washed plastic derived oil with an adsorbent to remove at least a portion of the halogen-containing compounds from the washed plastic derived oil to produce a treated plastic derived oil.

* * * * *